US011251567B2

(12) United States Patent
Mithani et al.

(10) Patent No.: US 11,251,567 B2
(45) Date of Patent: Feb. 15, 2022

(54) FLOATING MULTI-CONNECTOR BLIND MATING SYSTEM

(71) Applicant: Dell Products L.P., Round Rock, TX (US)

(72) Inventors: Noman Mithani, Fairview, TX (US); Salvador Jimenez, III, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 16/946,702

(22) Filed: Jul. 1, 2020

(65) Prior Publication Data
US 2022/0006238 A1 Jan. 6, 2022

(51) Int. Cl.
| | |
|---|---|
| *H01R 13/631* | (2006.01) |
| *H01R 13/514* | (2006.01) |
| *H01R 43/26* | (2006.01) |
| *H01R 13/506* | (2006.01) |
| *H01R 12/73* | (2011.01) |

(52) U.S. Cl.
CPC ....... *H01R 13/6315* (2013.01); *H01R 12/737* (2013.01); *H01R 13/506* (2013.01); *H01R 13/514* (2013.01); *H01R 43/26* (2013.01)

(58) Field of Classification Search
CPC .............. H01R 13/6315; H01R 13/514; H01R 13/506; H01R 43/26; H01R 12/737
USPC .................................................. 439/247, 248
See application file for complete search history.

(56) References Cited

U.S. PATENT DOCUMENTS

| | | | | |
|---|---|---|---|---|
| 6,095,852 | A * | 8/2000 | Gregory, II | H01R 13/506 439/466 |
| 6,592,388 | B1 * | 7/2003 | Meiners | G06F 1/183 439/310 |
| 7,404,726 | B1 | 7/2008 | Herring et al. | |
| 8,585,421 | B2 * | 11/2013 | Yamaguchi | H01R 13/05 439/248 |
| 8,672,708 | B2 * | 3/2014 | Ritter | H01R 13/518 439/541.5 |
| 8,734,172 | B2 * | 5/2014 | Takei | H01R 12/7005 439/248 |
| 8,992,241 | B2 * | 3/2015 | Genest | H01R 13/6315 439/248 |
| 2006/0141836 | A1 * | 6/2006 | Van Der Mee | H01R 13/6315 439/247 |
| 2008/0020618 | A1 * | 1/2008 | Feldman | H01R 13/6315 439/248 |

(Continued)

*Primary Examiner* — Gary F Paumen
(74) *Attorney, Agent, or Firm* — Joseph Mencher

(57) ABSTRACT

A floating multi-connector blind mating system includes a multi-connector chassis coupled to a pair of first connectors that extend from the multi-connector chassis. A connector float subsystem in the multi-connector chassis is coupled to the pair of first connectors and allows each of the first connectors to move within a plane. A connector securing element on the multi-connector chassis is coupled to the pair of first connectors and resists movement of each of the pair of first connectors perpendicular to the plane. A respective blind-mate element is connected to each of a pair of second connectors, and the pair of first connectors are guided by the respective blind mate elements into engagement with the pair of second connectors when the multi-connector chassis is moved towards the pair of second connectors.

20 Claims, 20 Drawing Sheets

(56) References Cited

U.S. PATENT DOCUMENTS

2013/0005179 A1* 1/2013 Aldana .............. H01R 13/6315
439/529
2013/0157493 A1* 6/2013 Brown ...................... E06B 3/66
439/247

* cited by examiner

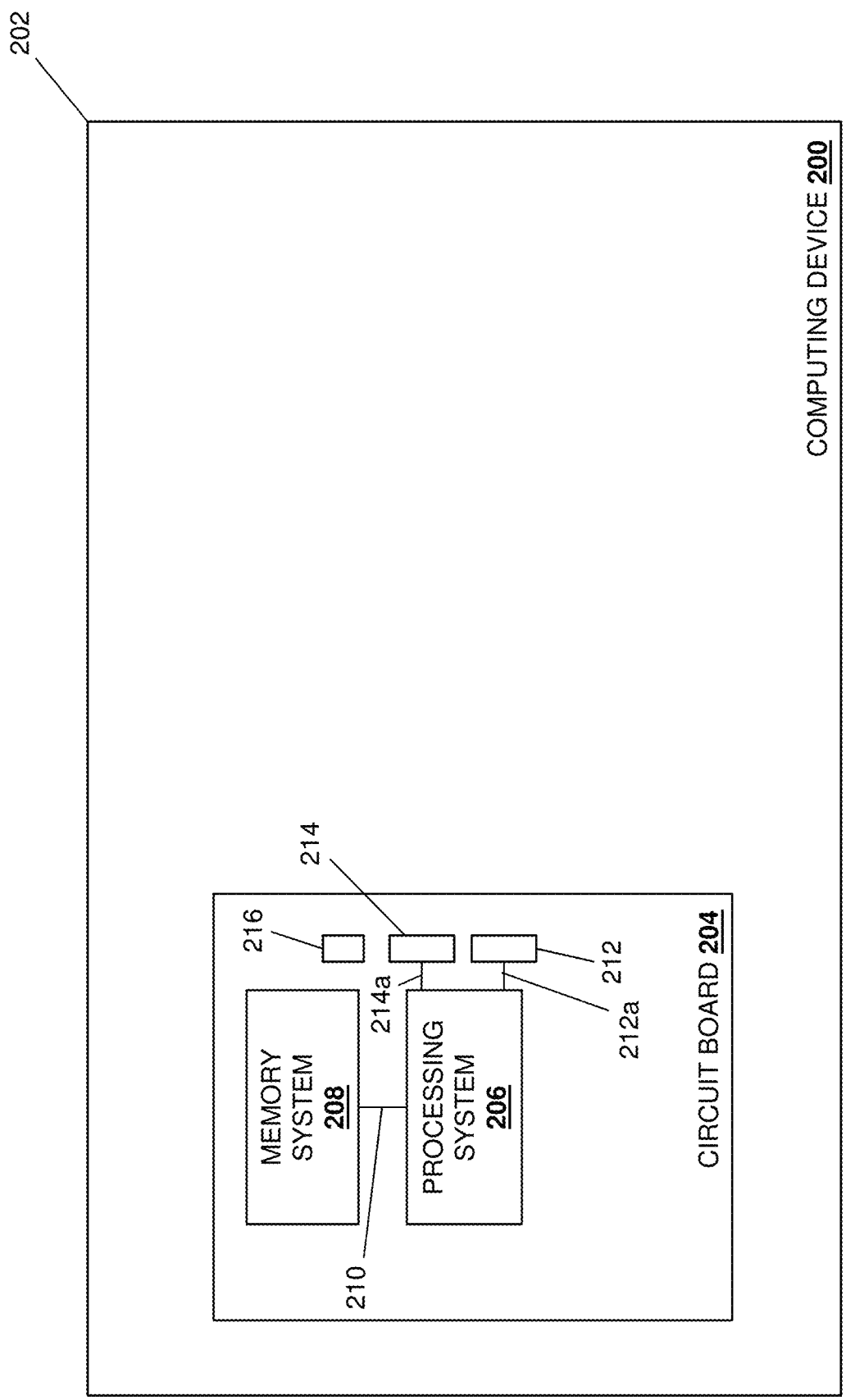

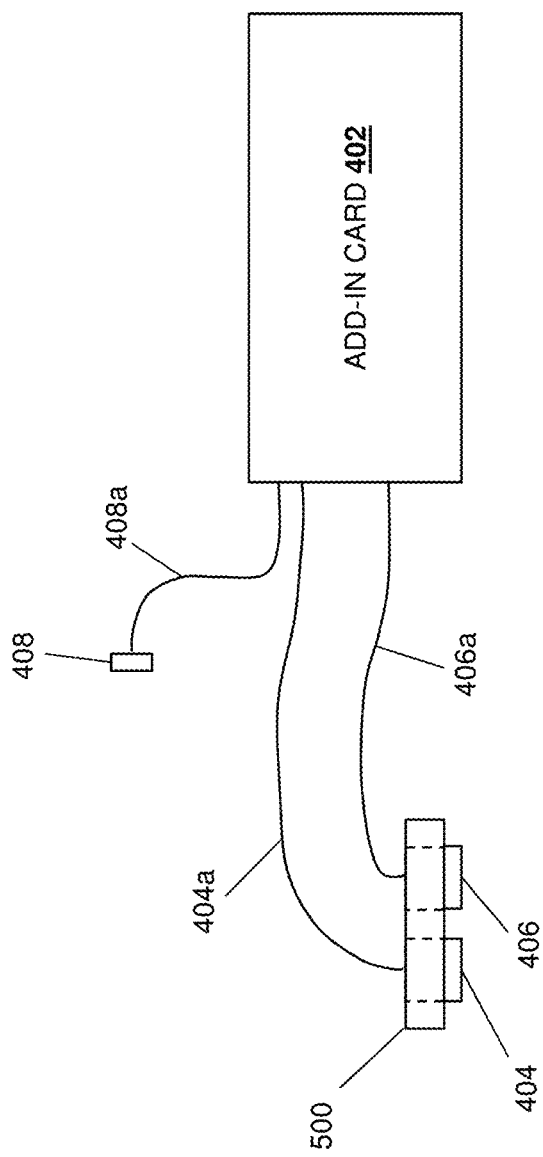

US 11,251,567 B2

FLOATING MULTI-CONNECTOR BLIND MATING SYSTEM

BACKGROUND

The present disclosure relates generally to information handling systems, and more particularly to blind mating multiple floating connectors in order to connect components in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, server computing devices, and/or other computing devices known in the art, include a variety of components that must be connected together. For example, the computing devices discussed above include a circuit board (e.g., a motherboard) having a processing system (e.g., a Central Processing Unit (CPU)), and may be provided with an add-in card that is configured to enable additional functionality for the computing device when it is connected to the motherboard. In many conventional computing devices, such add-in cards include a card connector edge that is configured to connect to a card connector slot that is mounted to the motherboard and coupled to the CPU (e.g., via traces in the motherboard). However, in order to provide increased signal integrity, reduced costs, and/or other benefits known in the art, add-in cards may instead be connected to the motherboard via cabling that extends from the add-in card and that includes cabled connectors that are configured to connect to standardized connectors (e.g., PCIe connectors, Mini Cooledge Input/Output (MCIO) connectors, Slimline connectors, etc.) that are mounted to the motherboard and coupled to the CPU (e.g., via traces in the motherboard). However, the multiple cabled connectors that are provided on cabling that extends from add-in cards must be manually connected to, and disconnected from, the standardized connectors on the motherboard, which can be a difficult process for the user. Furthermore, due to the ability to use the standardized connectors to connect to other components when add-in cards are not provided with the computing device, specialized modifications of those standardized connectors for use with the multiple cabled connectors provided on the cabling extending from add-in cards is not an option.

Accordingly, it would be desirable to provide a multi-connector coupling system that addresses the issues discussed above.

SUMMARY

According to one embodiment, an Information Handling System (IHS) includes a circuit board; a processing system that is mounted to the circuit board; and a memory system that is mounted to the circuit board, that is coupled to the processing system, and that includes instructions that, when executed by the processing system, cause the processing system to perform at least one computing operation; a plurality of card connectors that are mounted to the circuit board and coupled to the processing system; an add-in card; a plurality of computing device connectors that are coupled to the add-in card via cabling; and a floating multi-connector blind mating system that includes: a multi-connector chassis, wherein each of the plurality of computing device connectors are coupled to the multi-connector chassis and extend from the multi-connector chassis; a connector float subsystem that is coupled to each of the plurality of computing device connectors and that is configured to allow each of the plurality of computing device connectors to move within a plane; a connector securing element that is coupled to each of the plurality of computing device connectors and that is configured to resist movement of each of the plurality of computing device connectors perpendicular to the plane; and a respective blind-mate element connected to each of the plurality of card connectors, wherein the plurality of computing device connectors are configured to be guided by the respective blind mate elements into engagement with the plurality of card connectors.

BRIEF DESCRIPTION OF THE DRAWINGS

FIG. 2 is a schematic view illustrating an embodiment of a computing device that may utilize the floating multi-connector blind mating system of the present disclosure.

FIG. 8D is a schematic view illustrating an embodiment of the floating multi-connector blind mating system of FIGS. 8A, 8B, and 8C provided with the multiple computing device connectors on the add-in card system of FIGS. 4A and 4B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
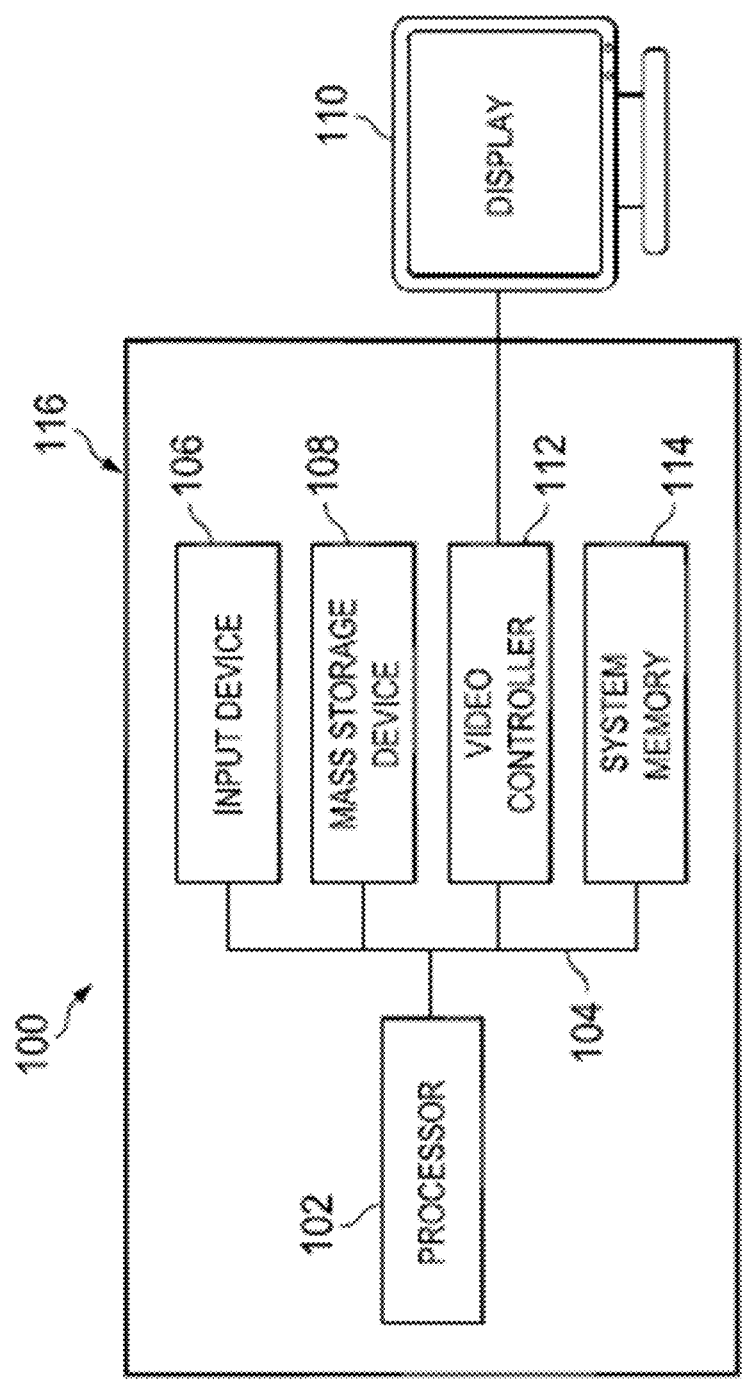
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a computing device 200 is illustrated that may utilize the floating multi-connector blind mating system of the present disclosure. In an embodiment, the computing device 200 may be provided by the IHS 100 discussed above with reference to FIG. 1 and/or may include some or all of the components of the IHS 100, and in the specific examples discussed below may be provided by a server computing device. However, while illustrated and discussed as being provided by a server computing device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated below.

For example, the chassis 202 may house a circuit board 204 that may be provided by a motherboard and/or other circuit boards that would be apparent to one of skill in the art in possession of the present disclosure. In the illustrated embodiment, a processing system 206 such as, for example, a Central Processing Unit (CPU), is mounted to the circuit board 204, a memory system 208 (e.g., Dynamic Random Access Memory (DRAM) devices) is mounted to the circuit board 204 and coupled to the processing system 206 via one or more traces 210 provided in the circuit board 204, and one of skill in the art in possession of the present disclosure will recognize that a variety of other computing device components may be mounted to the circuit board 204 and coupled to the processing system 206 while remaining within the scope of the present disclosure as well. A plurality of connectors may be mounted to the circuit board 204 and, in the embodiments illustrated and discussed below, include a pair of card data connectors 212 and 214 that are coupled to the processing system 206 via one or more traces 212a and 214a, respectively, provided in the circuit board 204, as well as a card power connector 216 that may be mounted to a power system (not illustrated) in the computing device 200.

In a specific example, the card data connectors 212 and 214 may be provided by Peripheral Component Interconnect express (PCIe) connectors, MCIO connectors, and/or Slimline connectors that one of skill in the art in possession of the present disclosure will recognize may be utilized as discussed below to connect the add-in card of the present disclosure to the processing system 206, while also being configured to each connect other respective devices to the processing system 206 in situations where the add-in card of the present disclosure is not utilized with the computing device 200. As such, in some embodiments, the card data connectors 212 and 214 may be considered "standardized" connectors that are each configured to couple a respective device to the processing system 206. However, while particular types of connectors are illustrated and discussed below, one of skill in the art in possession of the present disclosure will recognize that other connectors will fall within the scope of the present disclosure as well.

For example, as discussed below, in some embodiments the connectors utilized in the floating multi-connector blind mating system of the present disclosure (i.e., in the manner described below for the card data connectors 212 and 214) may be different types of connectors (e.g., a Mini Cooledge Input/Output (MCIO) connector and a Slimline connector) while remaining within the scope of the present disclosure as well. As such, while a specific computing device 200 is illustrated and described herein, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3A:
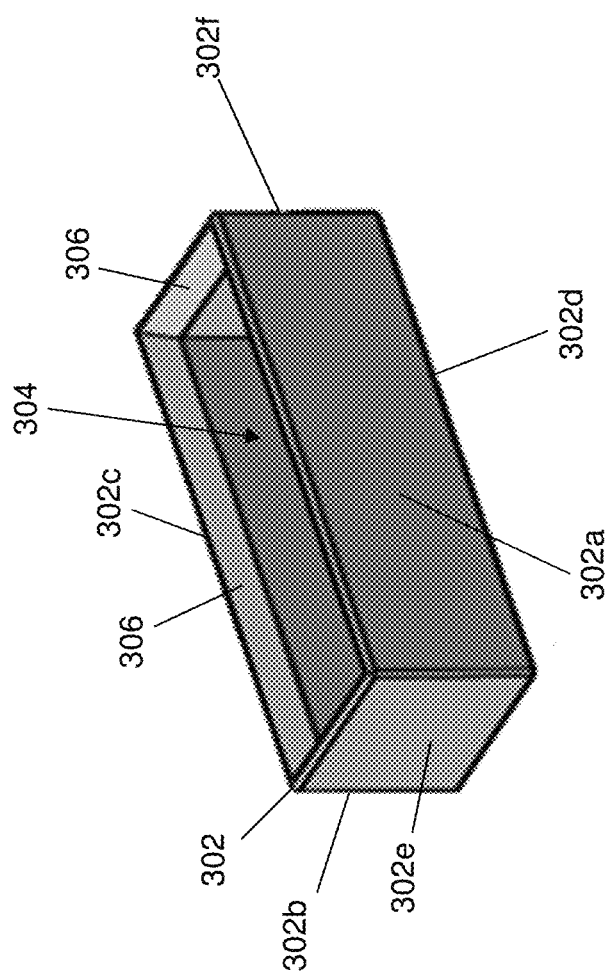
FIG. 3A is a perspective view illustrating an embodiment of a blind mate element that provides a portion of the floating multi-connector blind mating system of the present disclosure.
Figure 3B:
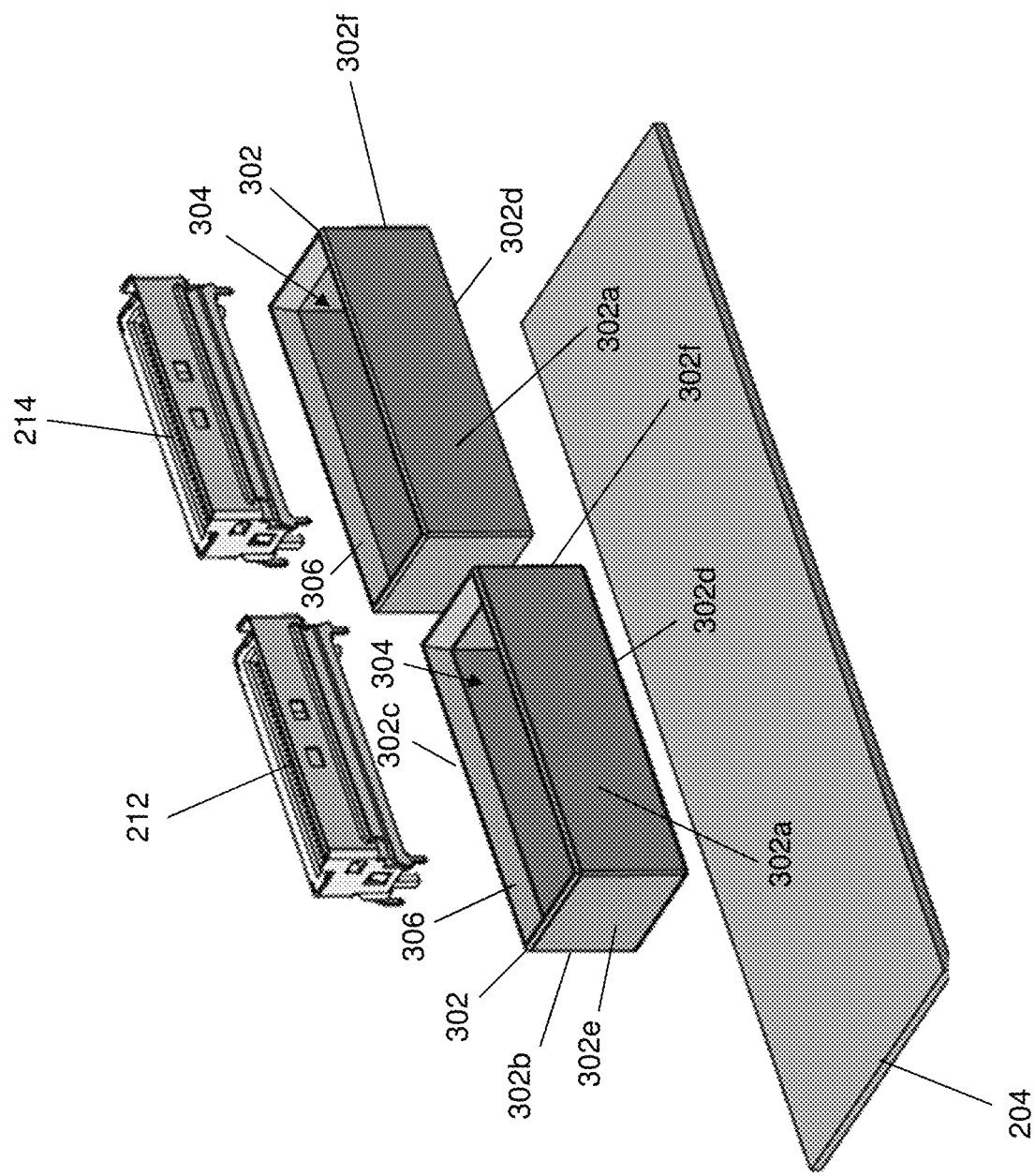
FIG. 3B is an exploded perspective view illustrating an embodiment of the blind mate element of FIG. 3A, card connectors, and a board that may be provided in the computing device of FIG. 2.
Figure 3C:
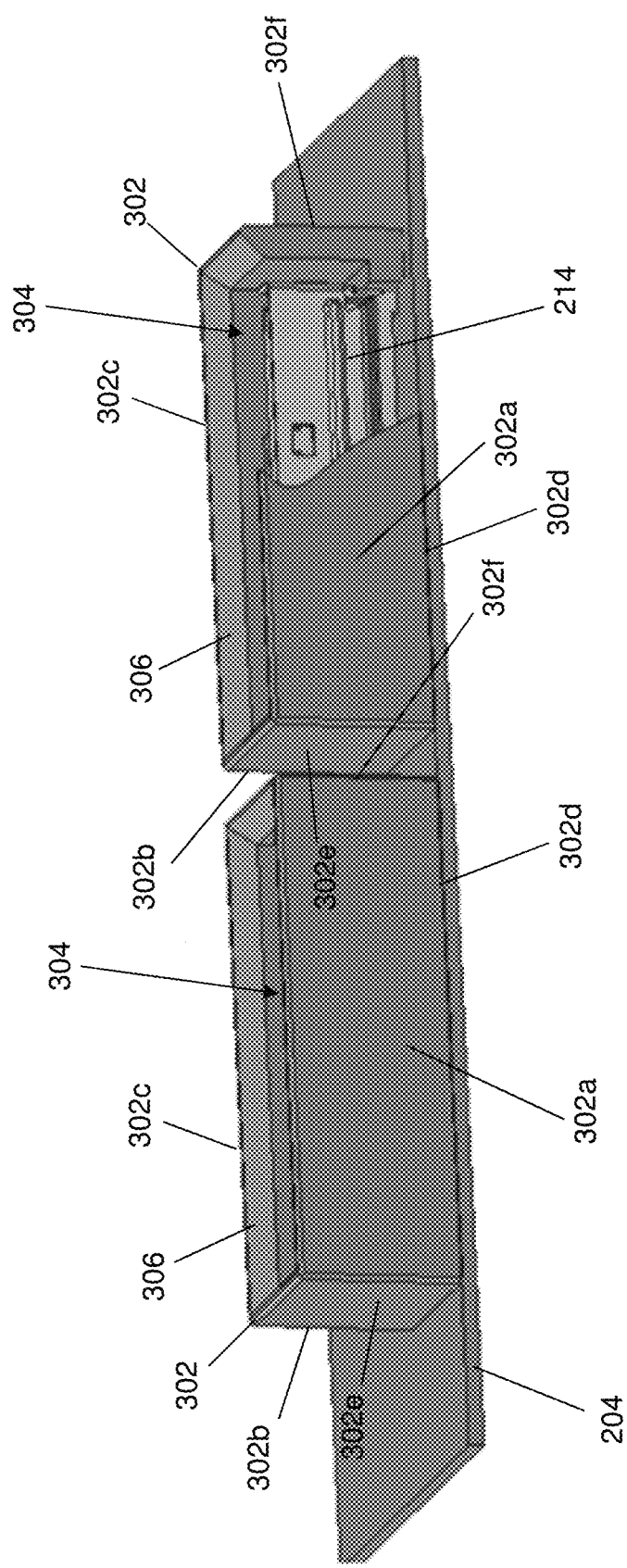
FIG. 3C is a cut-away perspective view illustrating an embodiment of the blind mate element of FIG. 3A connected to the card connectors on the board in the computing device of FIG. 2.

Referring now to FIGS. 3A-3C, an embodiment of a blind mate element 300 is illustrated that provides a portion of the floating multi-connector blind mating system of the present disclosure, and as discussed below the computing device 200 may be configured to utilize the floating multi-connector blind mating system of the present disclosure by coupling blind mate elements 300 to corresponding connectors on the circuit board 204. For example, as illustrated in FIG. 3A, a blind mate element 300 may include a base 302 having a front surface 302a, a rear surface 302b that is located opposite the base 302 from the front surface 302a, a top edge 302c that is located adjacent the front surface 302a and the rear surface 302b, a bottom edge 302d that is located opposite the base 302 from the top edge 302c and adjacent the front surface 302a and the rear surface 302b, and a pair of side surface 302e and 302f that are located opposite the base 302 from each other and that extend between the front surface 302a, the rear surface 302b, the top edge 302c, and the bottom edge 302d. A connector channel 304 is defined by the base 302 between the front surface 302a, the rear surface 302b, and the side surfaces 302e and 302f, and extends through the base 302 from the top edge 302c to the bottom edge 302d. As illustrated, the blind mate element 300 may include one or more connector coupling features (e.g., adjacent the connector channel 304) for connecting the blind mate element 300 to a card data connector and/or the circuit board 204 in the computing device 200, as discussed in further detail below. In the illustrated embodiment, the base 302 includes a chamfered surface 306 that extends from a perimeter of the base 302 provided by its top edge 302c in order to define a portion of the connector channel 304.

As illustrated in FIGS. 3B and 3C, a respective blind mate element 300 may be connected to each of the card data connectors 212 and 214 included on and mounted to the circuit board 204 in the computing device 200 discussed above with reference to FIG. 2. For example, FIG. 3B illustrates how a blind mate element 300 may be positioned adjacent the card data connector 212 on the circuit board 204 in the computing device 200 such that the bottom edge 302d of the base 302 faces the circuit board 204, with the connector channel 304 aligned with the card data connector 212 (i.e., the card data connector 212 and circuit board 204 are illustrated in exploded view in FIG. 3B for clarity, and one of skill in the art in possession of the present disclosure will appreciated that the card data connector 212 is actually mounted to the circuit board 204). The blind mate element 300 may then be moved towards the circuit board 204/card data connector 212 such that the card data connector 212 enters the connector channel 304, and as illustrated and discussed below connector coupling features on the blind mate element 300 engage the card data connector 212 and/or the circuit board 204 to connect the blind mate element 300 to the circuit board 204/card data connector 212, as illustrated in FIG. 3C.

Similarly, FIG. 3B illustrates how a blind mate element 300 may be positioned adjacent the card data connector 214 on the circuit board 204 in the computing device 200 such that the bottom edge 302d of the base 302 faces the circuit board 204, with the connector channel 304 aligned with the card data connector 214 (i.e., the card data connector 214 and circuit board 204 are illustrated in exploded view in FIG. 3B for clarity, and one of skill in the art in possession of the present disclosure will appreciated that the card data connector 214 is actually mounted to the circuit board 204). The blind mate element 300 may then be moved towards the circuit board 204/card data connector 214 such that the card data connector 214 enters the connector channel 304 and connector coupling features on the blind mate element 300 engage the card data connector 214 and/or the circuit board 204 to connect the blind mate element 300 to the circuit board 204/card data connector 214, as illustrated in FIG. 3C. However, while specific blind mate elements have been illustrated and described, one of skill in the art in possession of the present disclosure will recognize that blind mate elements that provide the blind mating functionality of present disclosure may include a variety of features and configurations other than those illustrated and described while falling within the scope of the present disclosure as well.

Figure 4A:
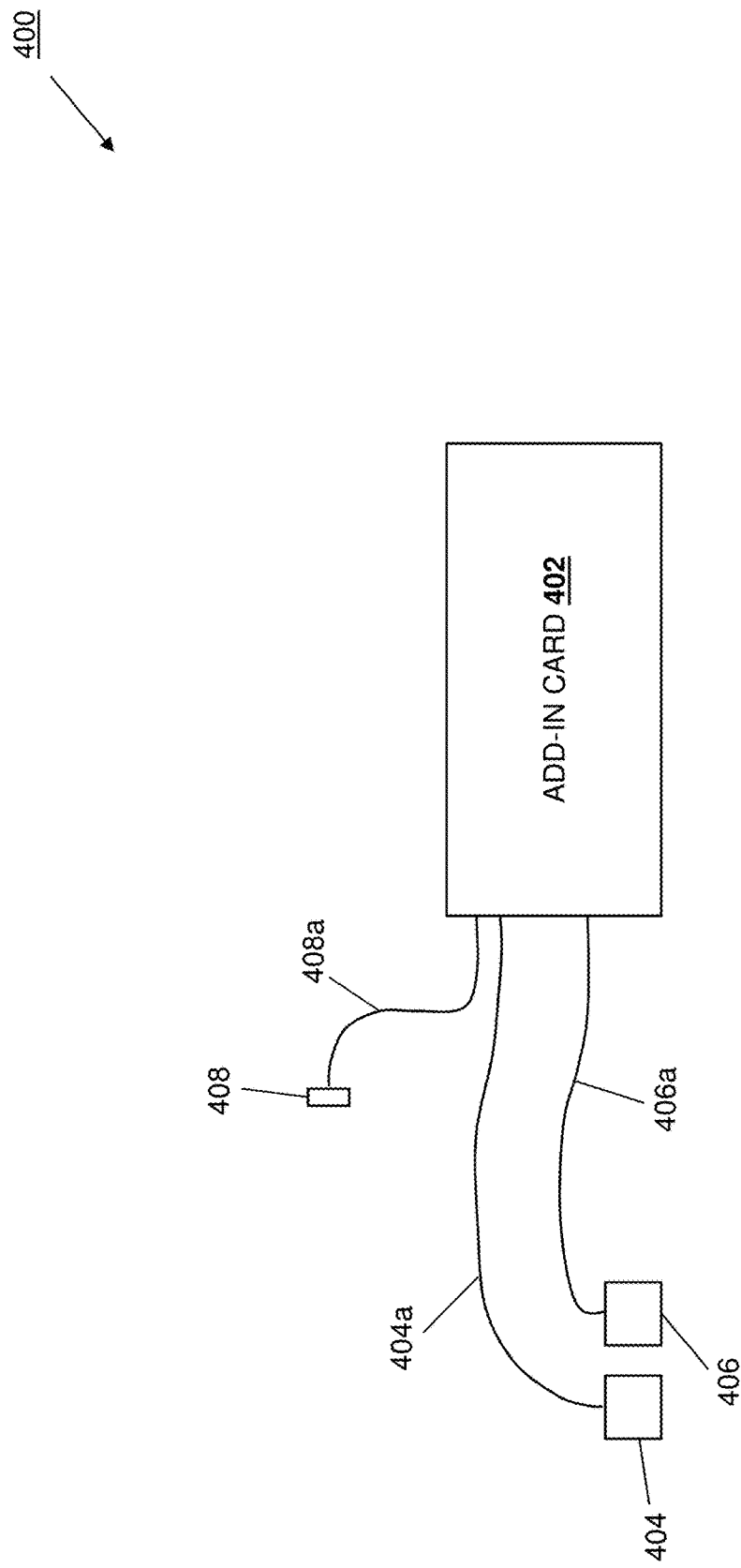
FIG. 4A is a schematic view illustrating an embodiment of an add-in card system that includes multiple computing device connectors that may be connected to the computing device of FIG. 2 using the floating multi-connector blind mating system of the present disclosure.
Figure 4B:
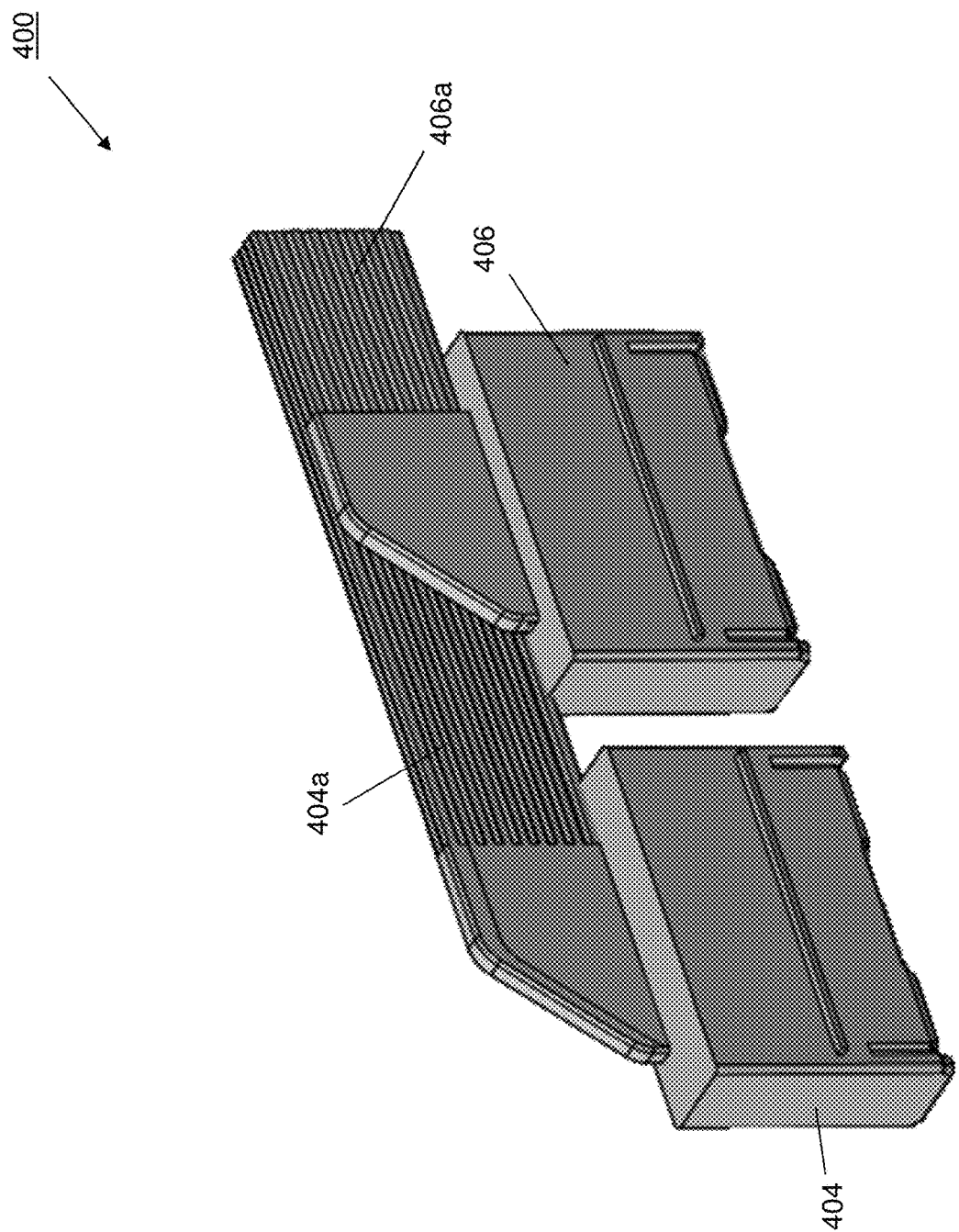
FIG. 4B is a perspective view illustrating an embodiment of the multiple computing device connectors on the add-in card system of FIG. 4A.

Referring now to FIGS. 4A and 4B, an add-in card system 400 is illustrated that may utilize the floating multi-connector blind mating system of the present disclosure. In the illustrated embodiment, the add-in card system 400 includes an add-in card 402 that one of skill in the art in possession of the present disclosure will recognize may include a circuit board having any of a variety of components mounted and/or coupled to that circuit board. In addition, a plurality of connectors may be coupled to the add-in card 402 via respective cabling and, in the embodiments illustrated and discussed below, those connectors include a pair of computing device data connectors 404 and 406 that are coupled to the add-in card 402 via respective cabling 404a and 406a that extends from the add-in card 402, as well as a computing device power connector 408 that is coupled to the add-in card 402 via cabling 408a that extends from the add-in card 402.

In a specific example, the computing device data connectors 404 and 406 may be provided by Peripheral Component Interconnect express (PCIe) connectors, MCIO connectors, and/or Slimline connectors that, as discussed below, may be utilized to connect the add-in card 402 to the computing device 200. However, while particular types of connectors are illustrated and discussed below, one of skill in the art in possession of the present disclosure will recognize that other connectors will fall within the scope of the present disclosure as well. For example, as discussed below, in some embodiments the connectors utilized in the floating multi-connector blind mating system of the present disclosure (i.e., in the manner described below for the computing device data connectors 404 and 406) may be different types of connectors (e.g., an MCIO connector and a Slimline connector) while remaining within the scope of the present disclosure as well. As such, while a specific add-in card system 400 is illustrated and described herein, one of skill in the art in possession of the present disclosure will recognize that the connectors that connect to the computing device of the present disclosure may be provided with a variety of systems while remaining within the scope of the present disclosure as well.

Figure 5:
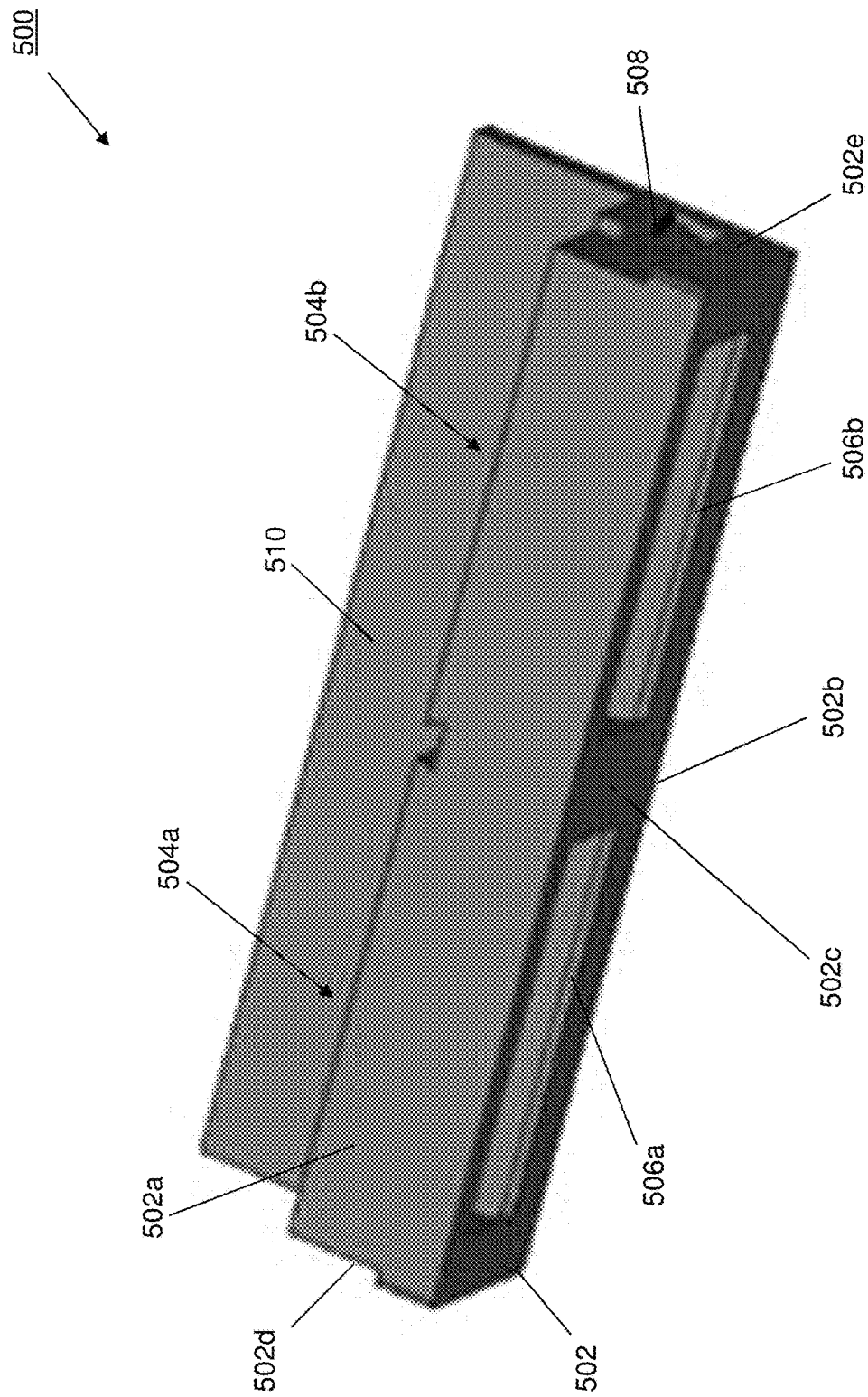
FIG. 5 is a perspective view illustrating an embodiment of a multi-connector chassis that provides a portion of the floating multi-connector blind mating system of the present disclosure.

Referring now to FIG. 5, an embodiment of a multi-connector chassis 500 is illustrated that provides a portion of the floating multi-connector blind mating system of the present disclosure, and as discussed below the multi-connector chassis 500 may be configured to couple to connectors on the add-in card system 400. For example, as illustrated in FIG. 5, a multi-connector chassis 500 includes a base 502 having a front wall 502a, a rear wall 502b that is located opposite the base 502 from the front wall 502a, a bottom wall 502c that extends between the front wall 502a and the rear wall 502b, and a pair of side walls 502d and 502e that are located on opposite sides of the base 502 and that each extend between the front wall 502a, the rear wall 502b, and the bottom wall 502c. A pair of connector housings 504a and 504b are defined by the base 502 between the front wall 502a, the rear wall 502b, the bottom wall 502c, and the pair of side walls 502d and 502e. Furthermore, the bottom wall 502c defines a pair of connector channels 506a and 506b that extend through the bottom wall 502c to the connector housings 504a and 504b, respectively. A connector securing feature 508 is illustrated as included on the side wall 502e, and as discussed below a similar connector securing feature 508 may be included on the side wall 502d as well. A chassis handle 510 extends from the rear wall 502b and, while not illustrated in FIG. 5, may define one or more securing apertures for securing the multi-connector chassis 500 to the computing device 200 as discussed below. However, while a specific multi-connector chassis 500 is illustrated and described herein, one of skill in the art in possession of the present disclosure will recognize that the multi-connector chassis of the present disclosure may include a variety of components and/or component configurations for providing the functionality discussed below while remaining within the scope of the present disclosure as well.

Figure 6:
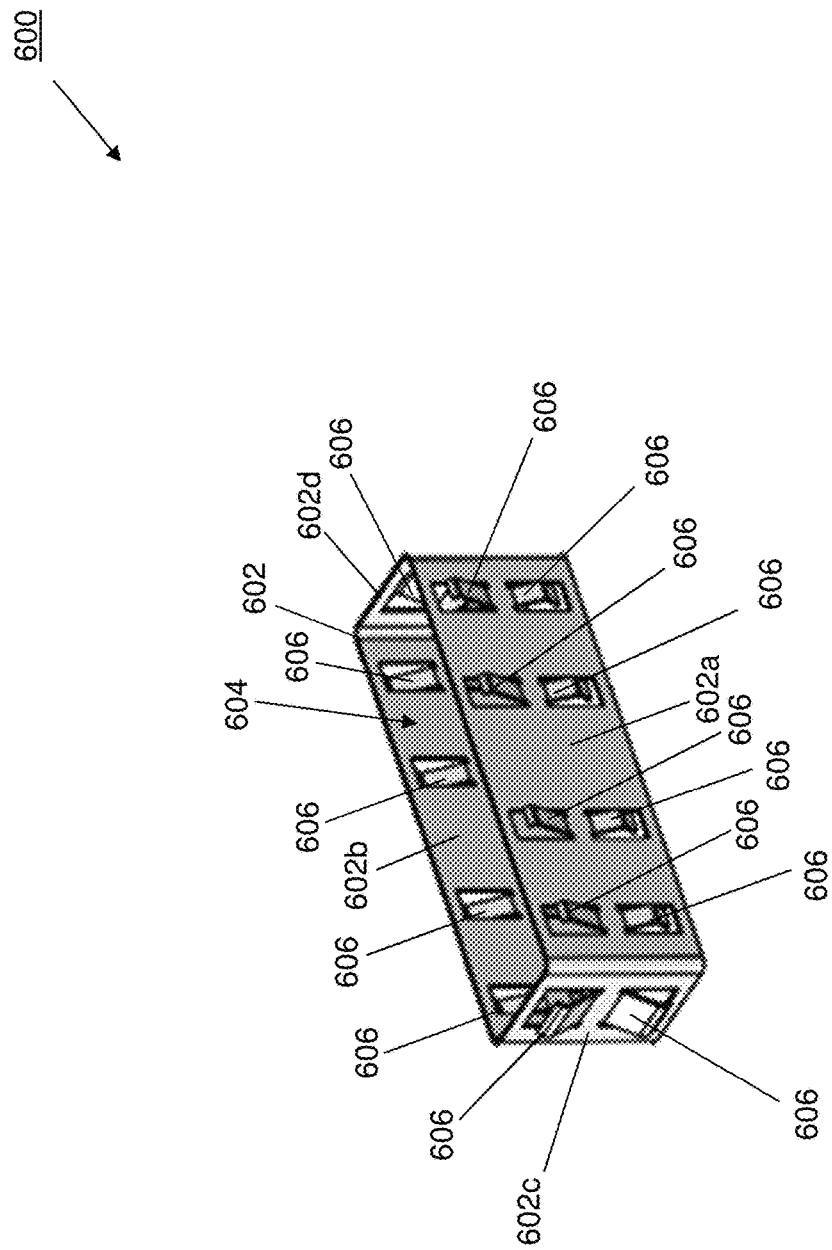
FIG. 6 is a perspective view illustrating an embodiment of a connector float subsystem that provides a portion of the floating multi-connector blind mating system of the present disclosure.

Referring now to FIG. 6, an embodiment of a connector float subsystem 600 is illustrated that provides a portion of the floating multi-connector blind mating system of the present disclosure, and as discussed below the connector float subsystem 600 may be configured to couple to connectors on the add-in card system 400, as well as to the multi-connector chassis 500. For example, as illustrated in FIG. 6, a connector float subsystem 600 includes a base 602 having a front wall 602a, a rear wall 602b that is located opposite the base 602 from the front wall 602a, and a pair of side walls 602c and 602d that are located on opposite sides of the base 602 and that each extend between the front wall 602a and the rear wall 602b. A connector channel 604 is defined by the base 602 between the front wall 602a, the rear wall 602b, and the pair of side walls 602c and 602d. Each of the front wall 602a, the rear wall 602b, and the side walls 602c and 602d include a plurality of spring members 606 that extends from the front wall 602a, the rear wall 602b, and the side walls 602c and 602d and away from the connector channel 604, and as discussed below may engage the multi-connector chassis 500 in order to provide the connector float functionality for the floating multi-connector blind mating system of the present disclosure. However, while a specific connector float subsystem 600 is illustrated and described herein, one of skill in the art in possession of the present disclosure will recognize that the connector float subsystem of the present disclosure may include a variety of components and/or component configurations for providing the functionality discussed below while remaining within the scope of the present disclosure as well.

Figure 7A:
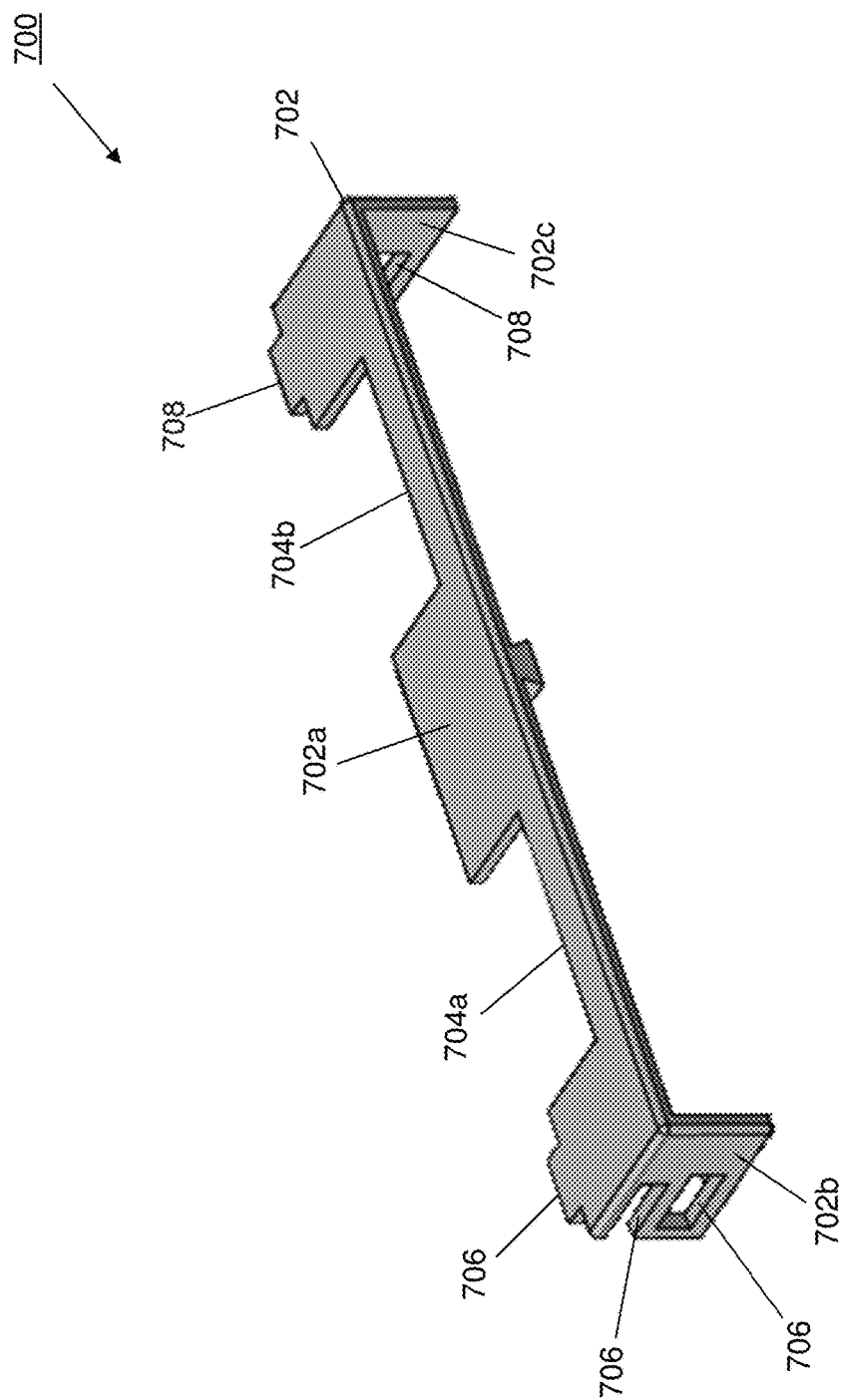
FIG. 7A is a top perspective view illustrating an embodiment of a connector securing element that provides a portion of the floating multi-connector blind mating system of the present disclosure.
Figure 7B:
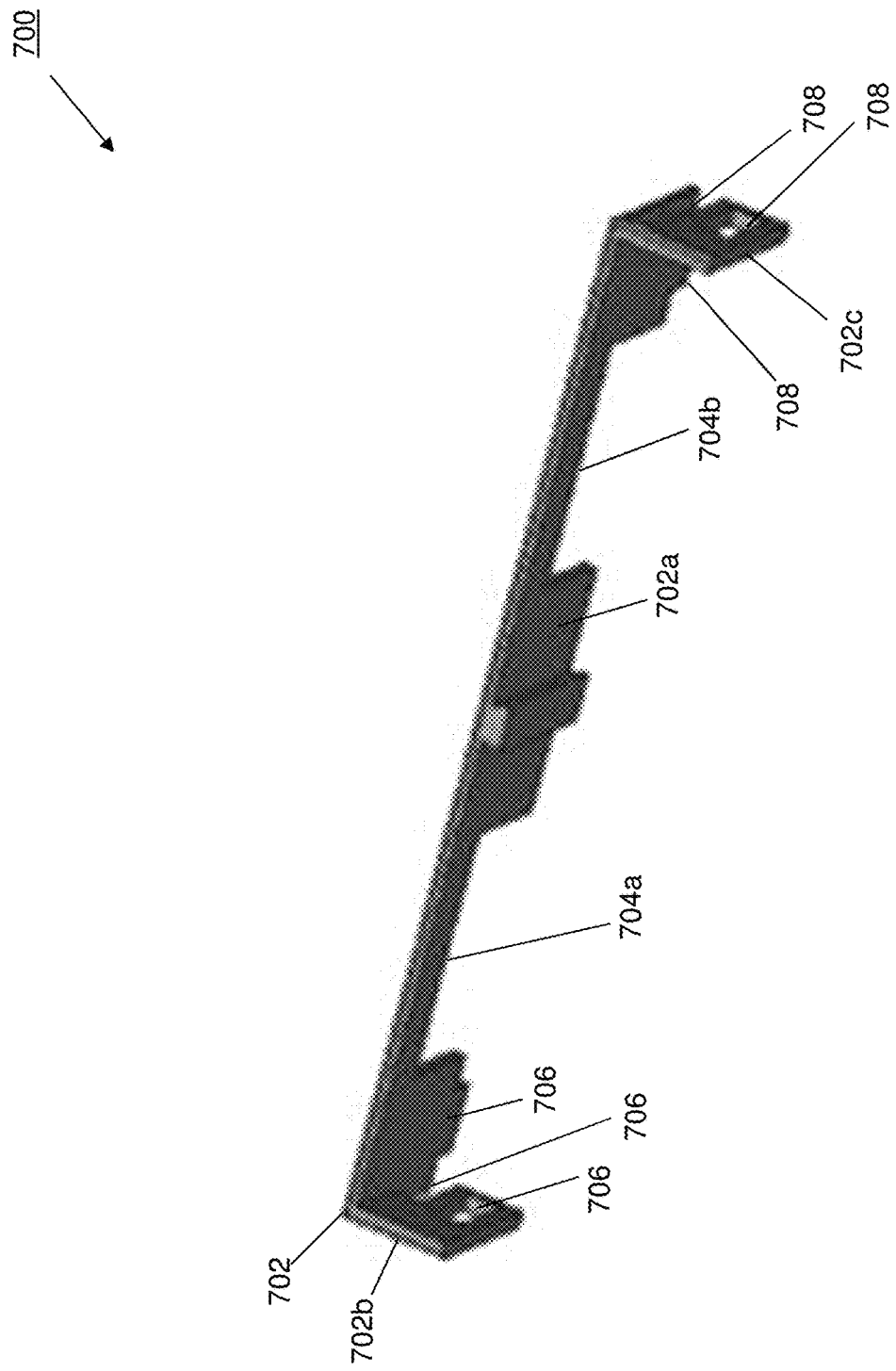
FIG. 7B is a bottom perspective view illustrating an embodiment of the connector securing element of FIG. 7A.

Referring now to FIGS. 7A and 7B, an embodiment of a connector securing element 700 is illustrated that provides a portion of the floating multi-connector blind mating system of the present disclosure, and as discussed below the connector securing element 700 may be configured to engage connectors on the add-in card system 400 and connect to the multi-connector chassis 500. For example, as illustrated in FIGS. 7A and 7B, a connector securing element 700 includes a base 702 having a base wall 702a, and a pair of side walls 702b and 702c that are located on opposite sides of the base wall 702a and that each extend substantially perpendicularly from the base wall 702a. A pair of connector channels 704a and 704b are defined by the base wall 702a in a spaced apart orientation from each other. The base wall 702a and each of the side walls 702b and 702c include a plurality of securing features 706 and 708 that are located on opposite sides of the connector securing element 700, and as discussed below may engage the multi-connector chassis 500 in order to secure the connector securing element 700 to the multi-connector chassis 500. However, while a specific connector securing element 700 is illustrated and described herein, one of skill in the art in possession of the present disclosure will recognize that the connector securing element of the present disclosure may include a variety of components and/or component configurations for providing the functionality discussed below while remaining within the scope of the present disclosure as well.

Figure 8A:
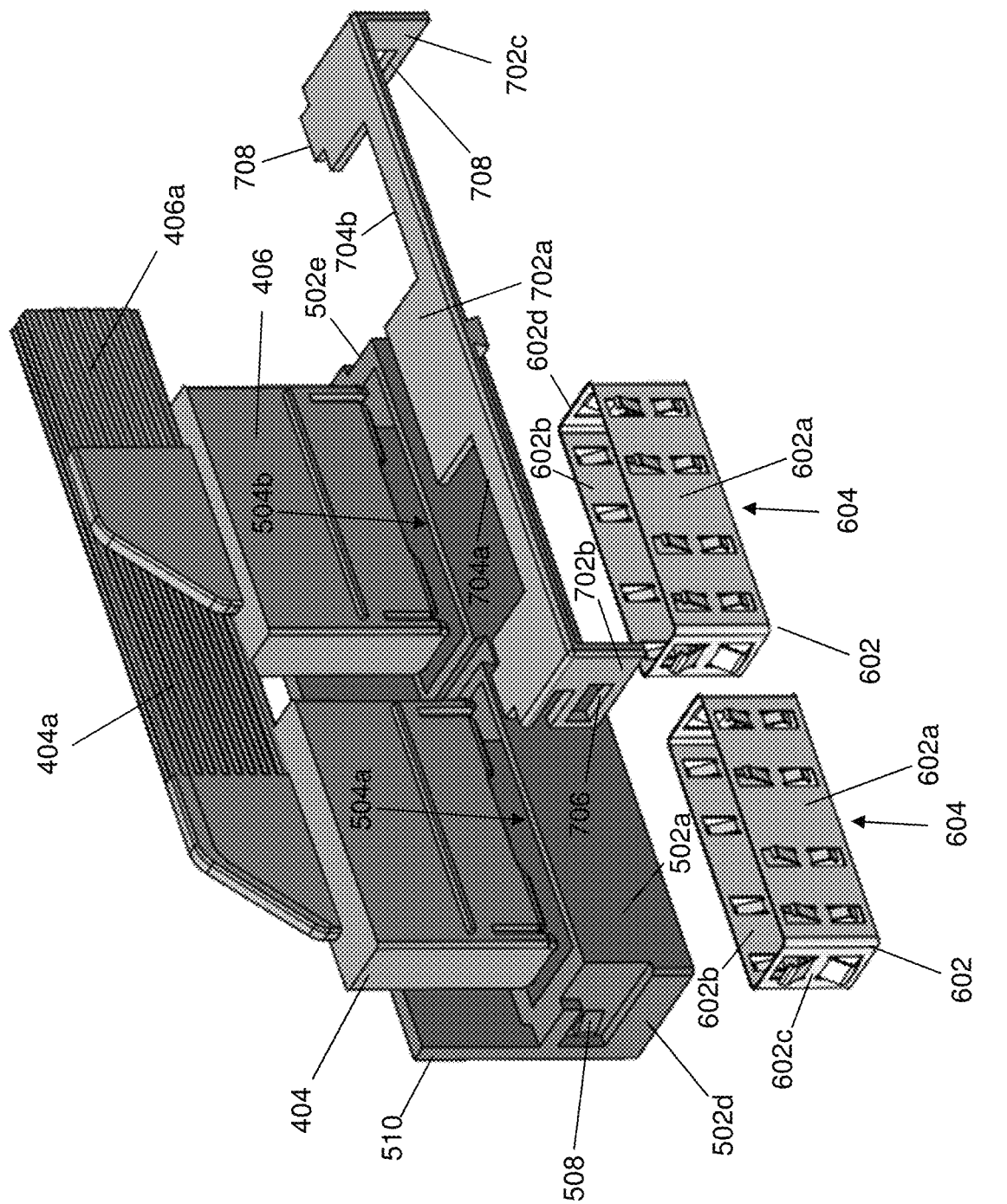
FIG. 8A is an exploded perspective view illustrating an embodiment of a floating multi-connector blind mating system including the multi-connector chassis of FIG. 5, the connector float subsystem of FIG. 6, and the connector securing element of FIGS. 7A and 7B provided with the multiple computing device connectors on the add-in card system of FIGS. 4A and 4B.
Figure 8B:
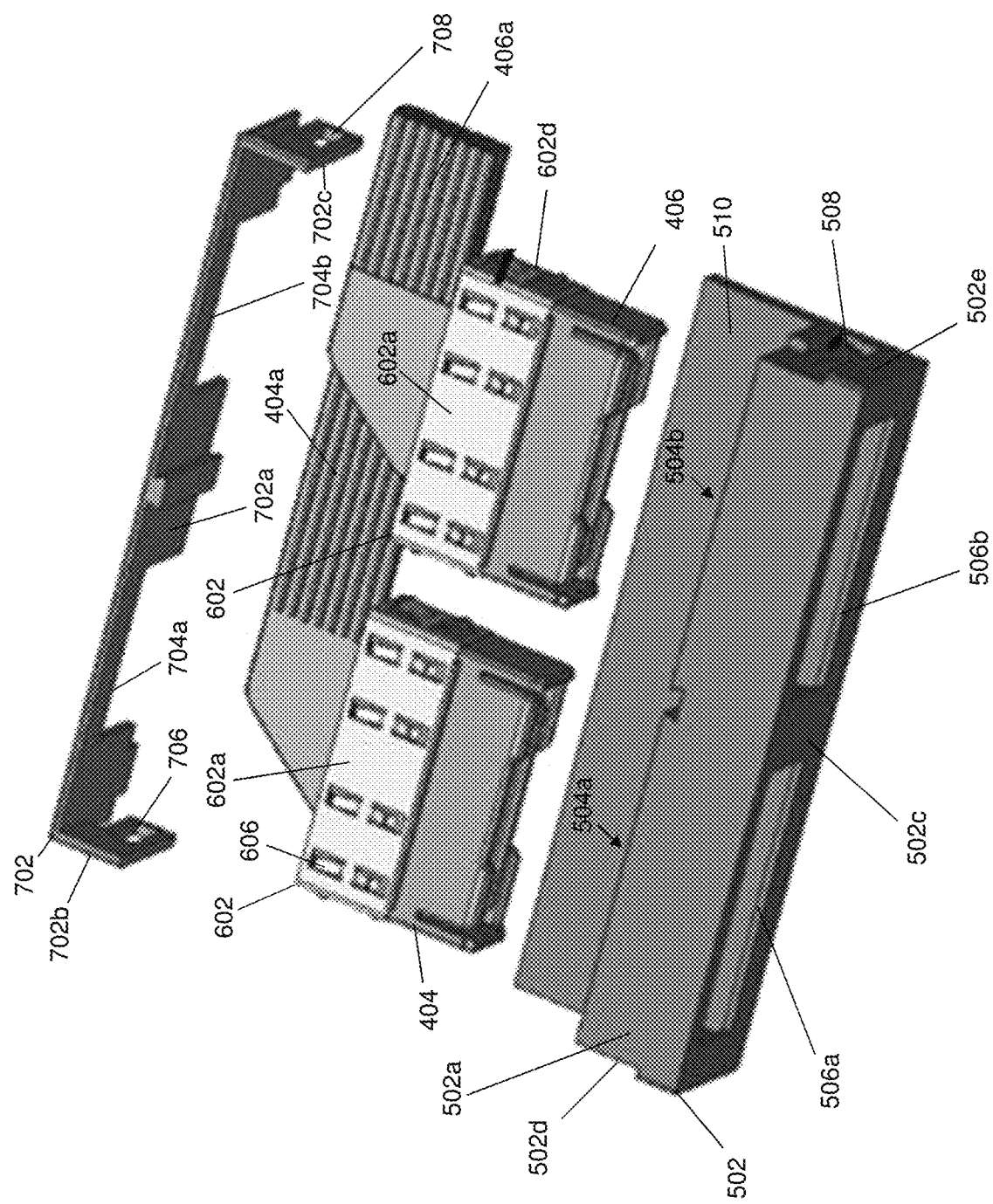
FIG. 8B is an exploded perspective view illustrating an embodiment of the floating multi-connector blind mating system of FIG. 8A.

With reference to FIGS. 8A, 8B, 8C, and 8D, the multi-connector chassis 500, the connector float subsystem 600, and the connector securing element 700 may be coupled to each other and the computing device data connectors 404 and 406 on the add-in card system 400, and one of skill in the art in possession of the present disclosure will recognize how FIGS. 8A and 8B illustrate various exploded views of the multi-connector chassis 500, the connector float subsystem 600, the connector securing element 700, and the computing device data connectors 404 and 406 in order to illustrate the coupling of those features of the floating multi-connector blind mating system discussed below. In an embodiment, a user that wishes to utilize the floating multi-connector blind mating system of the present disclosure may first couple a respective connector float subsystem 600 to each of the computing device data connectors 404 and 406 in the add-in card system 400. For example, each of the computing device data connectors 404 and 406 may be positioned adjacent a respective connector channel 604 defined by a respective connector float subsystem 600, and then moved into that respective connector channel 604 such that the respective connector float subsystem 600 is coupled to each computing device data connector 404 and 406, with a portion of the computing device data connector 404 and 406 extending from that connector float subsystem 600, as illustrated in FIG. 8B.

Figure 8C:
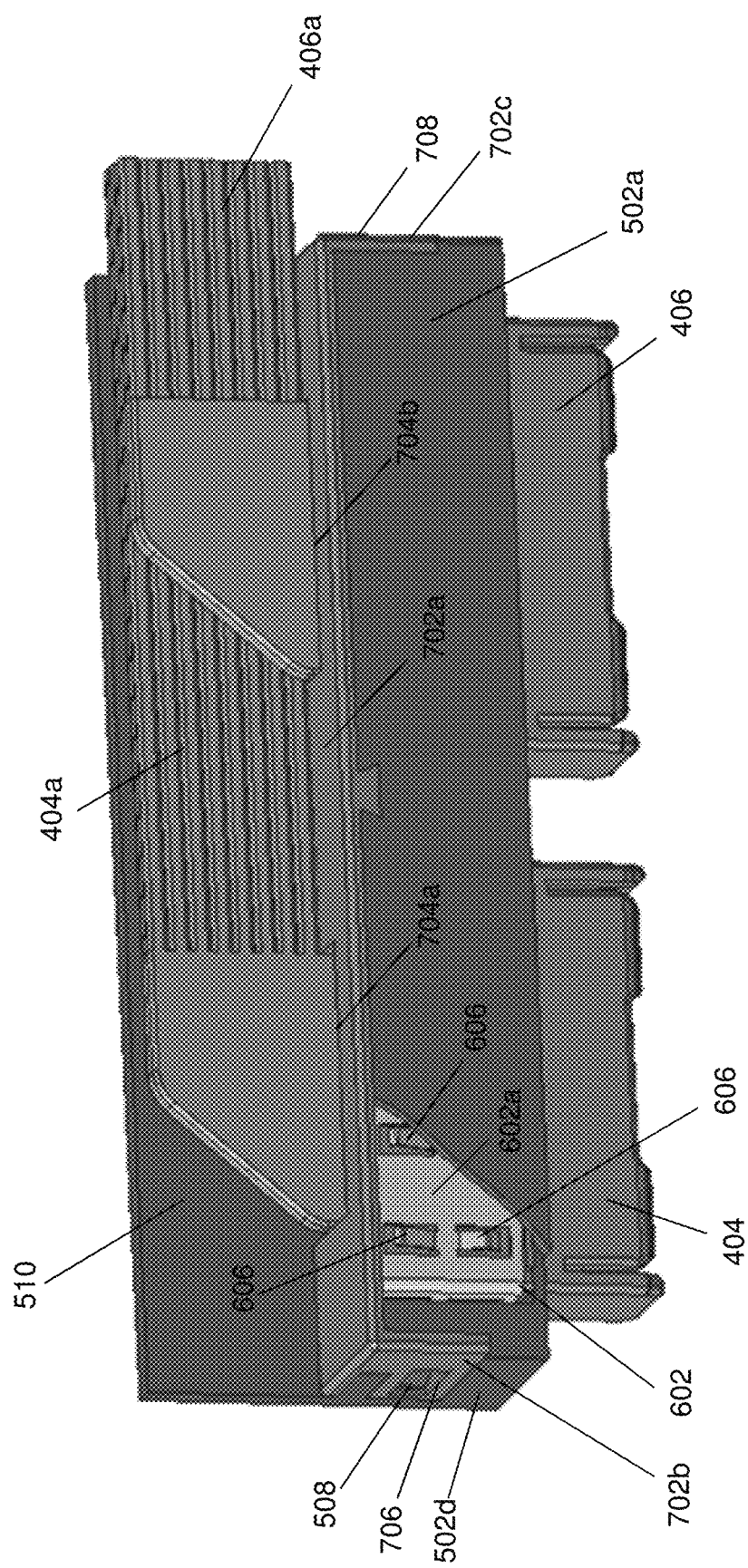
FIG. 8C is a cut-away perspective view illustrating an embodiment of the floating multi-connector blind mating system of FIGS. 8A and 8B.

The user may then couple the coupled-together computing device data connector 404/connector float subsystem 600 to the multi-connector chassis 500 by positioning the coupled-together computing device data connector 404/connector float subsystem 600 adjacent the connector housing 504a defined by the multi-connector chassis 500, and then moving the coupled-together computing device data connector 404/connector float subsystem 600 into the connector housing 504a such that the computing device data connector 404 extends from the connector channel 506a defined by the multi-connector chassis 500 and out of the multi-connector chassis 500, as illustrated in FIG. 8C. Similarly, the user may also couple the coupled-together computing device data connector 406/connector float subsystem 600 to the multi-connector chassis 500 by positioning the coupled-together computing device data connector 406/connector float subsystem 600 adjacent the connector housing 504b defined by the multi-connector chassis 500, and then moving the coupled-together computing device data connector 406/connector float subsystem 600 into the connector housing 504b such that the computing device data connector 406 extends from the connector channel 506b defined by the multi-connector chassis 500 and out of the multi-connector chassis 500, as illustrated in FIG. 8C. As will be appreciated by one of skill in the art in possession of the present disclosure, with the coupled-together computing device data connector 404/connector float subsystem 600 and the coupled-together computing device data connector 406/connector float subsystem 600 positioned in the connector housings 504a and 504b, respectively, the spring members 606 on each connector float subsystem 600 may engage (or be configured to engage) the multi-connector chassis 500 to provide a spring/biasing force on the computing device data connectors 404 and 406 to provides the connector float functionality discussed below.

The user may then couple the connector securing element 700 to the multi-connector chassis 500 to secure the computing device data connectors 404 and 406 in the multi-connector chassis 500 by, for example, positioning the connector securing element 700 adjacent the multi-connector chassis 500, computing device data connectors 404/406, and cabling 404a/406a such that the connector channels 704a and 704b defined by the connector securing element 700 are aligned with the connectors 404 and 406, respectively, and their cabling 404a/406a. The connector securing element 700 may then be moved towards the multi-connector chassis 500, computing device data connectors 404/406, and cabling 404a/406a such that the connectors 404 and 406 and/or their cabling 404a/406a are positioned in the connector channels 704a and 704b defined by the connector securing element 700, as illustrated in FIG. 8C. As will be appreciated by one of skill in the art in possession of the present disclosure, movement of the connector securing element 700 towards the multi-connector chassis 500 will cause the securing features 706 and 708 on the connector securing element 700 to engage the securing features 508 on the multi-connector chassis 500 in order to secure the connector securing element 700 to the multi-connector chassis 500, and the engagement of the base wall 702a on the connector securing element 700 with the computing device data connectors 404 and 406 will operate to resist movement of the computing device data connectors 404 and 406 out of the connector housings 504a and 504b defined by the multi-connector chassis 500.

Figure 8E:
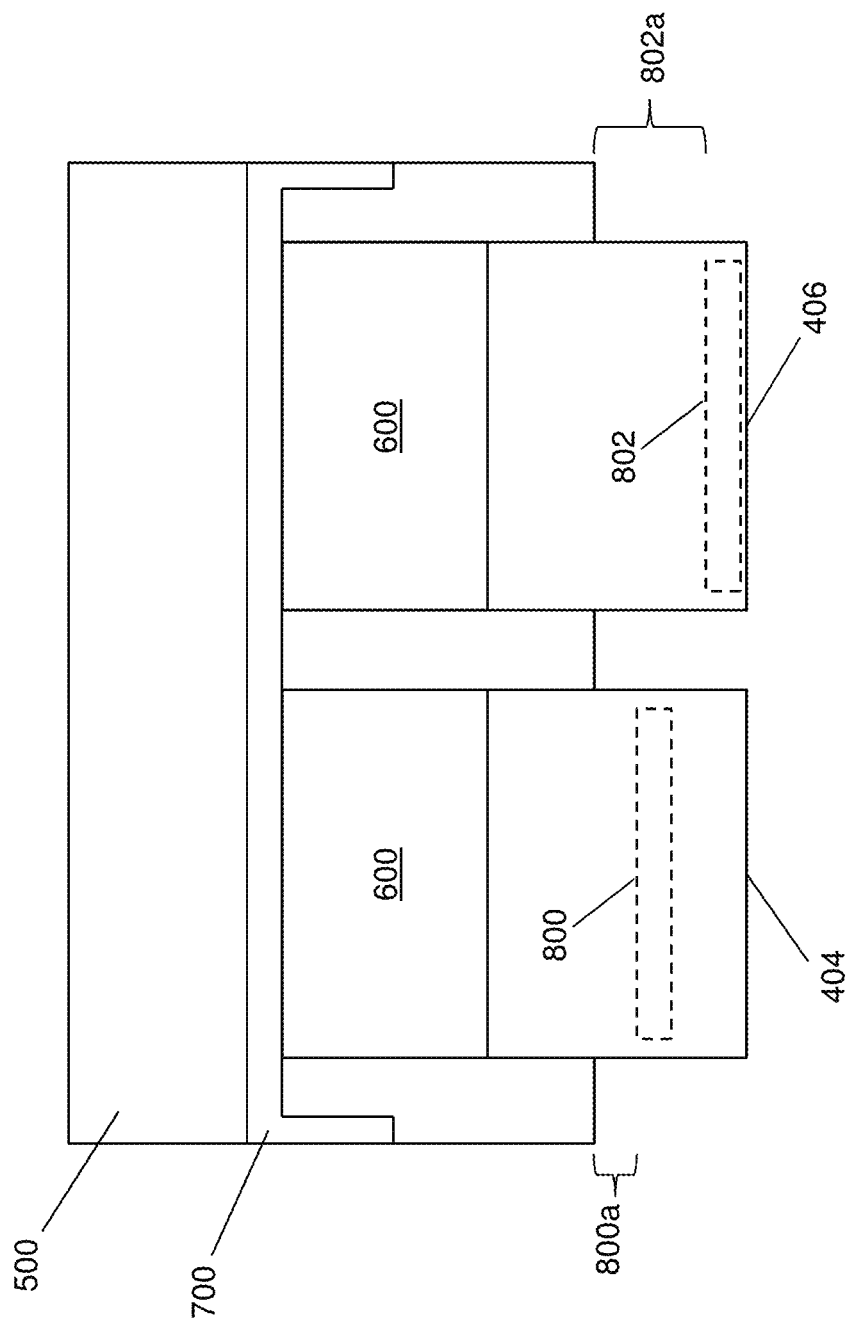
FIG. 8E is a schematic view illustrating an embodiment of the floating multi-connector blind mating system of FIGS. 8A, 8B, and 8C provided with different types of computing device connectors having connector elements positioned at different heights relative to each other.
Figure 9:
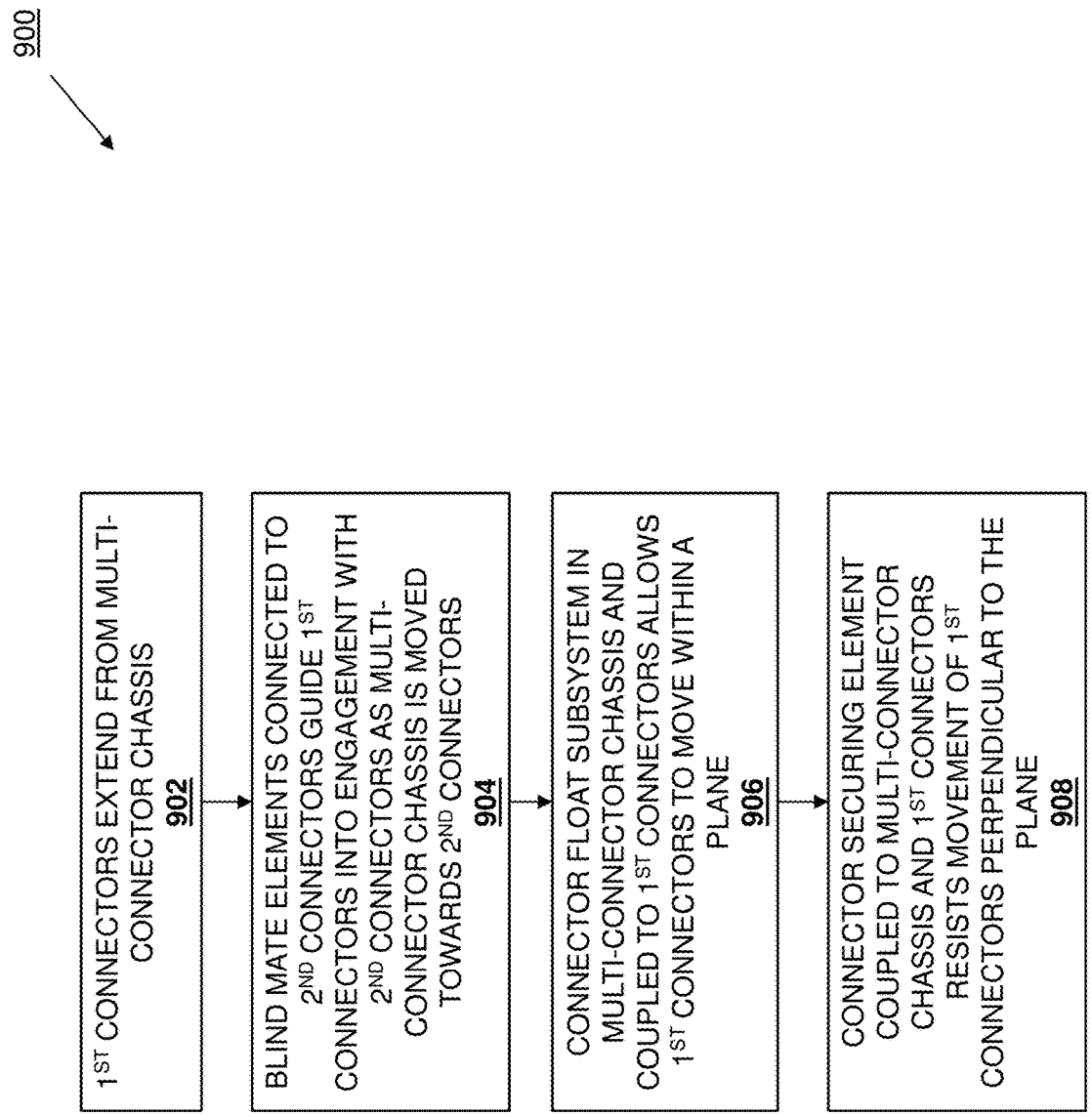
FIG. 9 is a flow chart illustrating an embodiment of a method for blind mating multiple floating connectors to a computing device.

As discussed above, while many of the examples above provide the computing device data connectors 404 and 406 as the same type of connector, in some embodiments, the computing device data connector 404 may be a different type of computing device data connector than the computing device data connector 406. For example, with reference to FIG. 8E, the computing device data connector 404 may be a first type of computing device data connector that includes a computing device data connector element 800 that is positioned a distance 800a from the multi-connector chassis 500, and the computing device data connector 406 may be a second type of computing device data connector that is different from the first type of computing device data connector and that includes a computing device data connector element 802 that is positioned a distance 802a from the multi-connector chassis 500 that is greater than the distance 800a. As will be appreciated by one of skill in the art in possession of the present disclosure, the floating multi-connector blind mating system of the present disclosure will allow the connection of two different types of computing device data connectors like those illustrated in FIG. 8E to be connected to corresponding card connectors in a computing device at the same time. However, while a specific coupling of multiple connectors to a multi-connector chassis has been described, one of skill in the art in possession of the present disclosure will recognize that the teachings of the present disclosure may be applied to the provisioning of multiple connectors in a multi-connector chassis in a variety of manners that will fall within the scope of the present disclosure as well.

Referring now to FIG. 6, an embodiment of a method 600 for blind mating multiple floating connectors to a computing device is illustrated. As discussed below, the systems and methods of the present disclosure provide a multi-connector chassis that allows first connectors coupled thereto to move in multiple directions within a plane while resisting movement of the first connectors in a direction perpendicular to that plane, which allows a user to use the multi-connector chassis to connect the first connectors to respective second connectors on a computing device. For example, the floating multi-connector blind mating system of the present disclosure includes a multi-connector chassis that couples to each of a plurality of first connectors such that each of the first connectors extend from the multi-connector chassis. A connector float subsystem couples to each of the first connectors in order to allow each of the first connectors to move within a plane in the multi-connector chassis, and a connector securing element couples to the first connectors and is secured to the multi-connector chassis in order to resist movement of each of the first connectors perpendicular to the plane. A respective blind-mate element is connected to each of a plurality of second connectors, and the blind mate elements guide the first connectors into engagement with respective second connectors when the multi-connector chassis is moved towards the second connectors. As such, multiple first connectors that are each configured to be manually connected to standardized second connectors may both be blind-mated with those standardized second connectors at the same time using the teachings of the present disclosure.

The method 600 begins at block 602 where first connectors extend from a multi-connector chassis. In an embodiment, at block 602, a user may wish to connect the computing device data connectors 404 and 406 in the add-in card system 400 to the card data connectors 212 and 214 in the computing device 200 and, in response, may provide a respective connector float subsystem 600 on each of the computing device data connectors 404 and 406, position the connector float subsystems 600/computing device data connectors 404 and 406 in the multi-connector chassis 500, and secure the computing device data connectors 404 and 406 in the multi-connector chassis 500 using the connector securing element 700, as discussed in detail above with regard to FIGS. 8A-8D. As discussed above and as illustrated in FIGS. 8C, 10A, and 100, with the computing device data connectors 404 and 406 secured in the multi-connector chassis 500, the computing device data connectors 404 and 406 extend through the connector channels 506a and 506b, respectively, and from the bottom wall 502c of the multi-connector chassis 500.

Figure 10A:
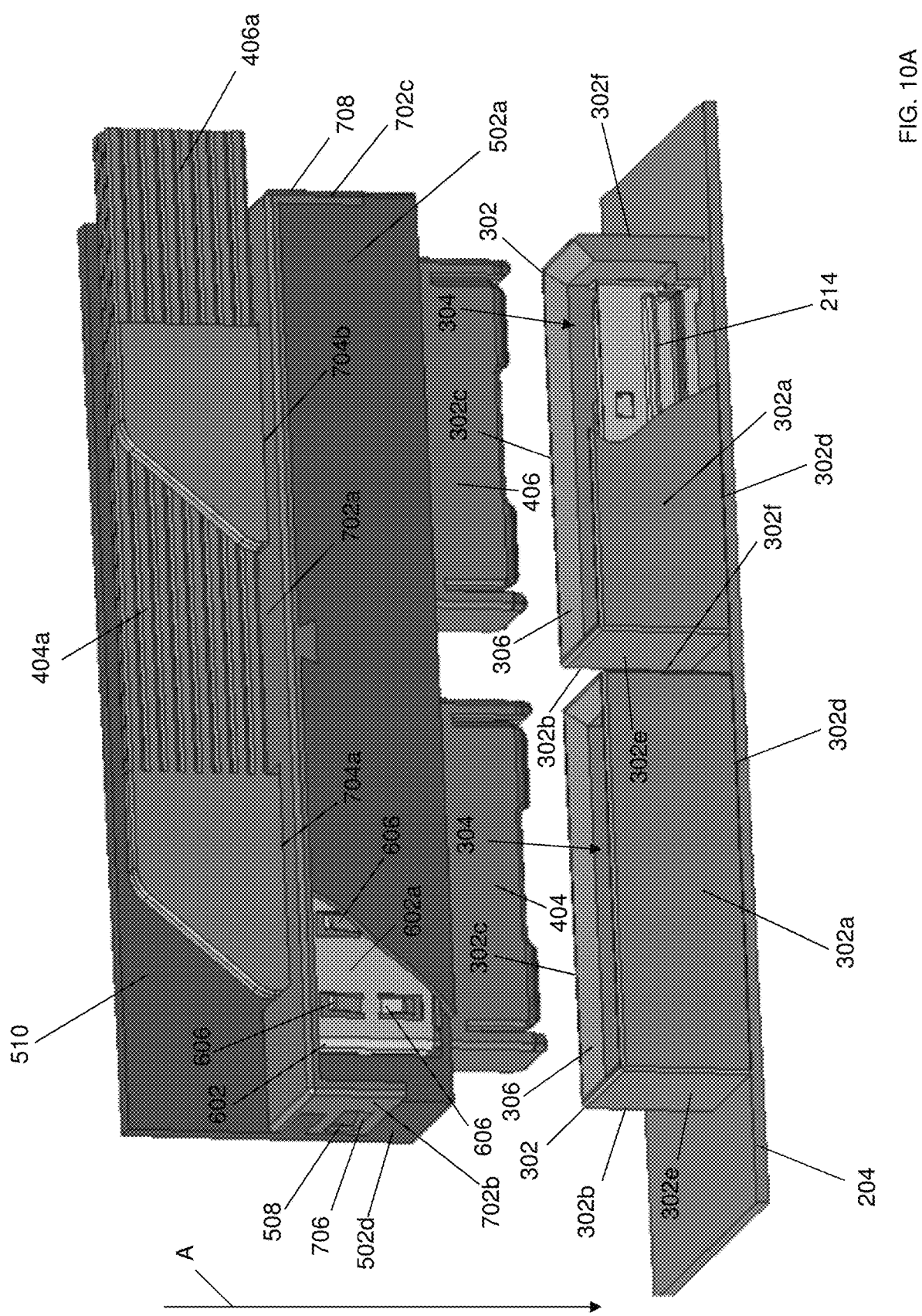
FIG. 10A is a perspective view illustrating an embodiment of the multiple computing device connectors on the add-in card system of FIGS. 4A and 4B provided with the floating multi-connector blind mating system of FIGS. 8A-8D and being connected to the card connectors on the board in the computing device of FIGS. 2 and 3A-3C.
Figure 10B:
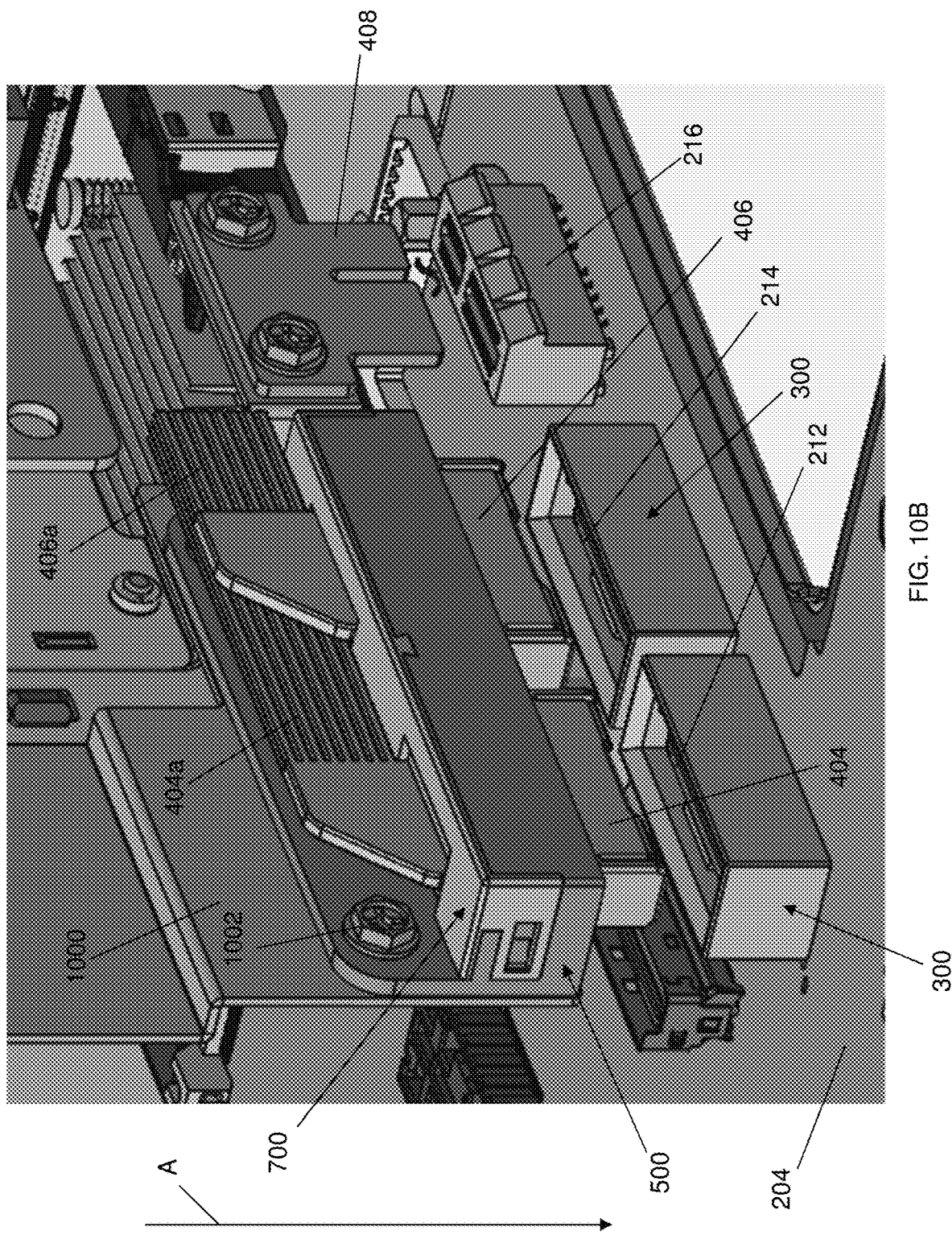
FIG. 10B is a perspective view illustrating an embodiment of the multiple computing device connectors on the add-in card system of FIGS. 4A and 4B provided with the floating multi-connector blind mating system of FIGS. 8A-8D and being connected to the card connectors on the board in the computing device of FIGS. 2 and 3A-3C.

The method 600 then proceeds to block 604 where blind mate elements that are connected to second connectors guide the first connectors into engagement with the second connectors as the multi-connector chassis is moved towards the second connectors. In an embodiment, at block 604, the user may use the chassis handle 510 on the multi-connector chassis 500 to position the multi-connector chassis 500 adjacent the circuit board 204 in the computing device 200 such that the computing device data connectors 404 and 406 are aligned with the blind mate elements 300/card data connectors 212 and 214, respectively, as illustrated in FIGS. 10A and 10B. The user may then use the chassis handle 510 to move the multi-connector chassis 500 in a direction A such that the computing device data connectors 404 and 406 engage the blind mate elements 300 connected to the card data connectors 212 and 214, respectively. At block 604, the engagement of the computing device data connectors 404 and 406 and the blind mate elements 300 connected to the card data connectors 212 and 214 may include the engagement of the computing device data connectors 404 and 406 with the chamfered surfaces 306 on the blind mate elements 300, which operates to guide the computing device data connectors 404 and 406 towards the connector channels 304 and into alignment with the card data connectors 212 and 214, respectively. As such, one of skill in the art in possession of the present disclosure will appreciate how different portions of the computing device data connectors 404 and 406 may engage the chamfered surface 306 adjacent any portion of the perimeter of the top edge 302c on the blind mate elements 300.

The method 600 then proceeds to block 606 where a connector float subsystem that is housed in the multi-connector chassis and coupled to first connectors allows first connectors to move within a plane. In an embodiment, at block 606 and in response to the movement of the multi-connector chassis 500 in a direction A, the computing device data connectors 404 and 406 will engage the blind mate elements 300 connected to the card data connectors 212 and 214, respectively, to guide the computing device data connectors 404 and 406 until the computing device data connectors 404 and 406 engage the card data connectors 212 and 214, respectively, to connect the add-in card system 400 to the processing system 206. As will be appreciated by one of skill in the art in possession of the present disclosure, the engagement of the computing device data connectors 404 and 406 with the blind mate elements 300 and/or the card data connectors 212 and 214 will result in forces being provided on the computing device data connectors 404 and 406 that may overcome the biasing forces provided on the computing device data connectors 404 and 406 by the spring members 606 on the connector float subsystems 600 (i.e., biasing forces provided via engagement of the spring members 606 with the multi-connector chassis 500), which may then move the computing device data connectors 404 and 406 relative to the multi-connector chassis 500. Furthermore, one of skill in the art in possession of the present disclosure will appreciate that the movement of the computing device data connectors 404 and 406 relative to the multi-connector chassis 500 may be in any direction in a plane (e.g., a plane that is perpendicular to the direction A of movement of the multi-connector chassis 500 in the example provided).

The method 600 then proceeds to block 608 where a connector securing element that is coupled to the multi-connector chassis and the first connectors resists movement of the first connectors perpendicular to the plane. In an embodiment, at block 608 and during the movement of the multi-connector chassis 500 in the direction A, the connection of the connector securing element 700 with the multi-connector chassis 500 will operate to resist movement of the computing device data connectors 404 and 406 opposite the direction A (e.g., to resist movement in a direction is that perpendicular to the plane in which the connector float subsystems 600 allows the computing device data connectors 404 and 406 to move).

Figure 10C:
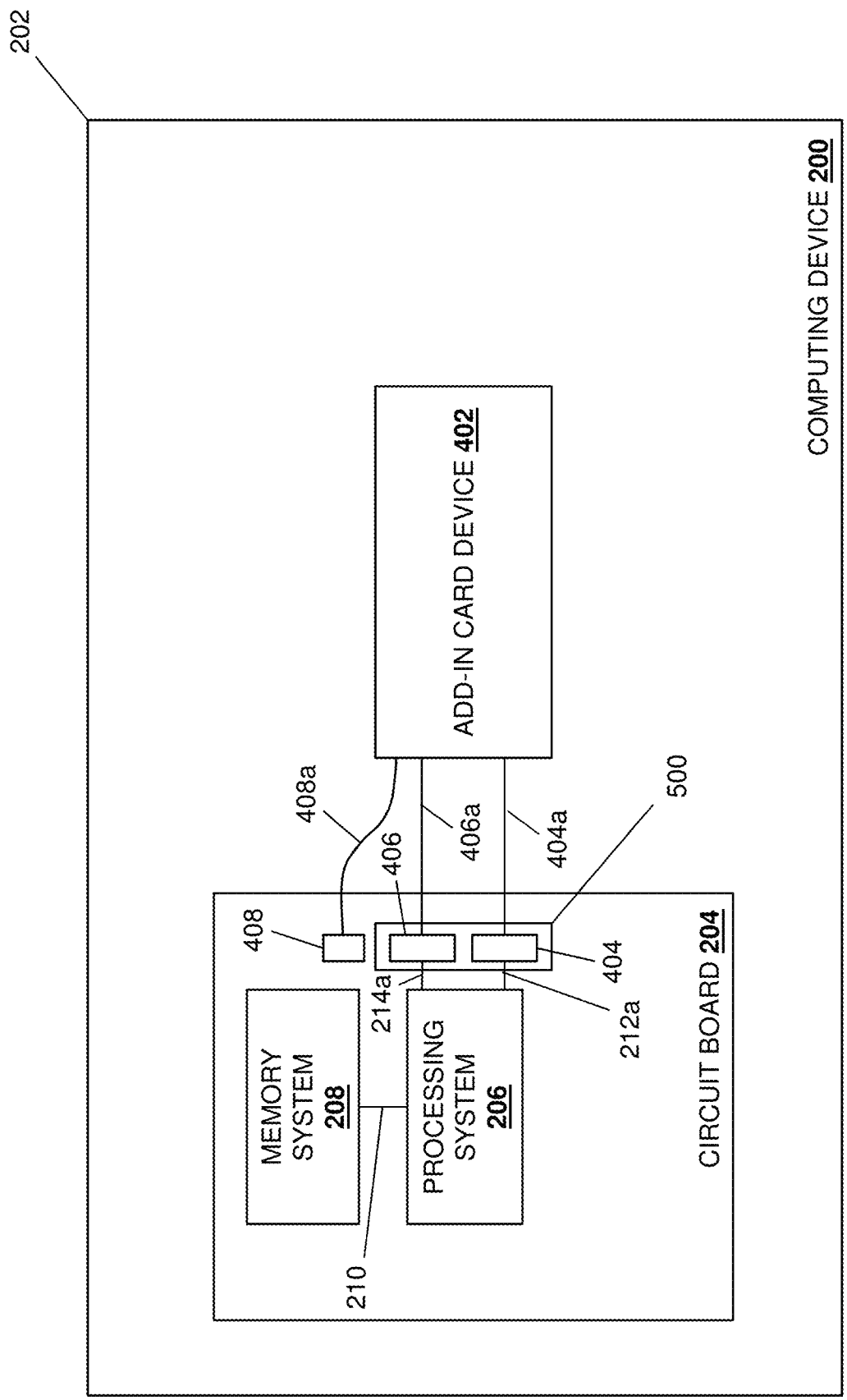
FIG. 10C is a schematic view illustrating an embodiment of the multiple computing device connectors on the add-in card system of FIGS. 4A and 4B provided with the floating multi-connector blind mating system of FIGS. 8A-8D and having been connected to the card connectors on the board in the computing device of FIGS. 2 and 3A-3C.

As such, engagement of the computing device data connectors 404 and 406 with the top edges 302c of the blind mate elements 300, or engagement of the computing device data connectors 404 and 406 with the card data connectors 212 and 214, may result in a force being provided on the computing device data connectors 404 and 406 that is opposite the direction A in which the multi-connector chassis 500 is being moved, but the connection of the connector securing element 700 with the multi-connector chassis 500 and the engagement of the connector securing element 700 and the computing device data connectors 404 and 406 will resist that force and prevent the computing device data connectors 404 and 406 from moving opposite the direction A relative to the multi-connector chassis 500. As such, each of the computing device data connectors 404 and 406 may be connected to the card data connectors 212 and 214, respectively, in the computing device 200 at the same time using the multi-connector chassis 500, thus coupling the add-in card 402 to the processing system 206 in order to allow for data transmission between the processing system 206 and the add-in card 402. As illustrated in FIGS. 10B and 100, the computing device power connector 408 may also be connected to the card power connector 216 as well in order to, for example, provide power from the circuit board 204 to the add-in card 402. FIG. 10B also illustrates how the computing device 200 may include a riser cage 1000 or other chassis support 1000, and a securing element 1002 (e.g., a screw) may be coupled to the chassis handle 510 (e.g., via a securing aperture defined by the chassis handle 510, not illustrated) and secured to the riser cage 1000 (e.g., once the computing device data connectors 404 and 406 engage the card data connectors 212 and 214, not illustrated in FIG. 10B) in order to further secure the data connectors 404 and 406 to the card data connectors 212 and 214, respectively. For example, while not illustrated in detail in FIGS. 10A, 10B, and 10C, one of skill in the art in possession of the present disclosure will appreciate that the riser cage 1000 may latch to the chassis 202 of the computing device 200, and thus the securing of the chassis handle 510 to the riser cage 1000 (e.g., via the securing element 1002) operates to hold the computing device data connectors 404 and 406 (and their cabling 404a and 406a, respectively) in engagement with the card data connectors 212 and 214.

Thus, systems and methods have been described that provide a multi-connector chassis that allows computing device connectors coupled thereto to move in different directions within a plane while resisting movement of the computing device connectors in a direction perpendicular to that plane, which allows a user to use the multi-connector chassis to connect the computing device connectors to respective card connectors on a server device. For example, the floating multi-connector blind mating system of the present disclosure includes a multi-connector chassis that couples to each of a plurality of computing device connectors such that each of the computing device connectors extend from the multi-connector chassis. A connector float subsystem couples to each of the computing device connectors in order to allow each of the computing device connectors to move within a plane in the multi-connector chassis, and a connector securing element couples to the computing device connectors and secures to the multi-connector chassis in order to resist movement of each of the computing device connectors perpendicular to the plane. A respective blind-mate element is connected to each of a plurality of card connectors, and the blind mate elements guide the computing device connectors into engagement with respective card connectors when the multi-connector chassis is moved towards the card connectors. As such, multiple computing device connectors that are each configured to be manually connected to standardized card connectors may both be blind-mated with those standardized card connectors at the same time using the teachings of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A floating multi-connector blind mating system, comprising:
 a multi-connector chassis, wherein the multi-connector chassis is configured to couple to each of a plurality of first connectors such that each of the plurality of first connectors extend from the multi-connector chassis;
 a connector float subsystem that is configured, when the multi-connector chassis is coupled to each of the plurality of first connectors, to couple to each of the plurality of first connectors in order to allow each of the plurality of first connectors to move within a plane;
 a connector securing element that is configured, when the multi-connector chassis is coupled to each of the plurality of first connectors, to couple to each of the plurality of first connectors in order to resist movement of each of the plurality of first connectors perpendicular to the plane; and
 a respective blind-mate element that is configured to connect to each of a plurality of second connectors, wherein the plurality of first connectors are configured to be guided by the respective blind mate elements into engagement with the plurality of second connectors when the multi-connector chassis is coupled to each of the plurality of first connectors and moved towards the plurality of second connectors.

2. The system of claim 1, wherein the plurality of second connectors are Peripheral Component Interconnect express (PCIe) connectors.

3. The system of claim 1, wherein the connector float subsystem includes:
 a plurality of spring members that are configured, when the multi-connector chassis is coupled to each of the plurality of first connectors, to allow each of the plurality of first connectors to move within the plane while providing a biasing force on each of the plurality of first connectors that is opposite the direction of motion within the plane.

4. The system of claim 1, wherein each of the respective blind-mate elements includes a plurality of chamfered edges that are configured to engage the first connectors to guide the first connectors into engagement with the plurality of second connectors when the multi-connector chassis is coupled to each of the plurality of first connectors and moved towards the plurality of second connectors.

5. The system of claim 1, wherein the connector securing element is configured, when the multi-connector chassis is coupled to each of the plurality of first connectors, to engage each of the plurality of first connectors and the multi-connector chassis to resist movement of each of the plurality of first connectors perpendicular to the plane.

6. The system of claim 1, wherein the plurality of first connectors include a first type of connector and a second type of connector that is different than the first type of connector.

7. An Information Handling System (IHS), comprising:
 a circuit board;
 a processing system that is mounted to the circuit board; and
 a memory system that is mounted to the circuit board, that is coupled to the processing system, and that includes instructions that, when executed by the processing system, cause the processing system to perform at least one computing operation;
 a plurality of card connectors that are mounted to the circuit board and coupled to the processing system;
 an add-in card;
 a plurality of computing device connectors that are coupled to the add-in card via cabling; and
 a floating multi-connector blind mating system that includes:
  a multi-connector chassis, wherein each of the plurality of computing device connectors are coupled to the multi-connector chassis and extend from the multi-connector chassis;
  a connector float subsystem that is coupled to each of the plurality of computing device connectors and that is configured to allow each of the plurality of computing device connectors to move within a plane;
  a connector securing element that is coupled to each of the plurality of computing device connectors and that is configured to resist movement of each of the plurality of computing device connectors perpendicular to the plane; and a respective blind-mate element connected to each of the plurality of card connectors, wherein the plurality of computing device connectors are configured to be guided by the respective blind mate elements into engagement with the plurality of card connectors.

8. The IHS of claim 7, wherein the plurality of card connectors are Peripheral Component Interconnect express (PCIe) connectors.

9. The IHS of claim 7, wherein the connector float subsystem includes:
a plurality of spring members that allow each of the plurality of computing device connectors to move within the plane while providing a biasing force on each of the plurality of computing device connectors that is opposite the direction of motion within the plane.

10. The IHS of claim 7, wherein each of the respective blind-mate elements includes a plurality of chamfered edges that are configured to engage the first connectors to guide the first connectors into engagement with the plurality of second connectors.

11. The IHS of claim 7, wherein the connector securing element engages each of the plurality of first connectors and the multi-connector chassis to resist movement of each of the plurality of first connectors perpendicular to the plane.

12. The IHS of claim 7, wherein the plurality of computing device connectors include a first type of computing device connector and a second type of computing device connector that is different than the first type of computing device connector.

13. The IHS of claim 12, wherein the first type of computing device connector includes a first computing device connector element that is positioned a first distance from the multi-connector chassis, and wherein the second type of computing device connector includes a second computing device connector element that is positioned a second distance from the multi-connector chassis that is different than the first distance.

14. A method for blind mating multiple floating connectors to a computing device, comprising:
allowing, by a connector float subsystem that is housed in a multi-connector chassis and coupled to each of a plurality of first connectors that extend from the multi-connector chassis, each of the plurality of first connectors to move within a plane;
resisting, by a connector securing element that is coupled to each of the plurality of first connectors, movement of each of the plurality of first connectors perpendicular to the plane; and
guiding, by a respective blind-mate element that is connected to each of a plurality of second connectors, the plurality of first connectors into engagement with the plurality of second connectors when the multi-connector chassis is moved towards the plurality of second connectors.

15. The method of claim 14, wherein the plurality of second connectors are Peripheral Component Interconnect express (PCIe) connectors.

16. The method of claim 14, further comprising:
allowing, by a plurality of spring members that are included on the connector float subsystem, each of the plurality of first connectors to move within the plane while providing a biasing force on each of the plurality of first connectors that is opposite the direction of motion within the plane.

17. The method of claim 14, further comprising:
engaging, by a plurality of chamfered edges that are included on each of the respective blind-mate elements, the first connectors to guide the first connectors into engagement with the plurality of second connectors when the multi-connector chassis is moved towards the plurality of second connectors.

18. The method of claim 14, further comprising:
engaging, by the connector securing element, each of the plurality of first connectors and the multi-connector chassis to resist movement of each of the plurality of first connectors perpendicular to the plane.

19. The method of claim 14, wherein the plurality of first connectors include a first type of connector and a second type of connector that is different than the first type of connector.

20. The method of claim 19, wherein the first type of connector includes a first computing device connector element that is positioned a first distance from the multi-connector chassis, and wherein the second type of connector includes a second computing device connector element that is positioned a second distance from the multi-connector chassis that is different than the first distance.

* * * * *